US009172705B1

United States Patent
Kong et al.

(10) Patent No.: US 9,172,705 B1
(45) Date of Patent: Oct. 27, 2015

(54) SYSTEM AND METHOD FOR REMOTE, INTERACTIVE NETWORK AND BROWSING SUPERVISION, MONITORING, AND APPROVAL

(71) Applicant: Forcefield Online, Inc., Los Angeles, CA (US)

(72) Inventors: Michael Kong, Los Angeles, CA (US); Mark Madsen, Edmonton (CA)

(73) Assignee: FORCEFIELD ONLINE, INC, Los Angeles, CA (US)

( * ) Notice: Subject to any disclaimer, the term of this patent is extended or adjusted under 35 U.S.C. 154(b) by 0 days.

(21) Appl. No.: 14/328,443

(22) Filed: Jul. 10, 2014

(51) Int. Cl.
*H04L 29/06* (2006.01)
*H04L 9/32* (2006.01)
*G06F 17/00* (2006.01)
*G06F 12/14* (2006.01)
*H04L 29/08* (2006.01)

(52) U.S. Cl.
CPC ............... *H04L 63/10* (2013.01); *H04L 67/10* (2013.01); *G06F 2221/2113* (2013.01); *H04L 63/0227* (2013.01); *H04L 63/0236* (2013.01); *H04L 63/0263* (2013.01); *H04L 63/0281* (2013.01); *H04L 63/08* (2013.01); *H04L 63/1408* (2013.01)

(58) Field of Classification Search
CPC ............ H04L 63/0236; H04L 63/0263; H04L 63/0281; H04L 63/08; H04L 63/0227; H04L 63/1408; G06F 2221/2113
USPC .................. 713/154, 166, 168; 726/12, 13, 22
See application file for complete search history.

(56) References Cited

U.S. PATENT DOCUMENTS

| 7,047,561 | B1* | 5/2006 | Lee | 726/12 |
|---|---|---|---|---|
| 2007/0150918 | A1* | 6/2007 | Carpenter et al. | 725/25 |
| 2012/0222107 | A1* | 8/2012 | Sainio et al. | 726/12 |
| 2013/0254288 | A1* | 9/2013 | Harrison | 709/204 |
| 2013/0291055 | A1* | 10/2013 | Muppidi et al. | 726/1 |
| 2014/0026179 | A1* | 1/2014 | Devarajan et al. | 726/1 |
| 2014/0046830 | A1* | 2/2014 | Orozco et al. | 705/39 |
| 2014/0096029 | A1* | 4/2014 | Schultz | 715/747 |
| 2014/0128047 | A1* | 5/2014 | Edwards et al. | 455/415 |

OTHER PUBLICATIONS

"Net Nanny for Mac User's Manual;" ContentWatch Inc.; 2012 (76 pages).

* cited by examiner

*Primary Examiner* — Aravind Moorthy
(74) *Attorney, Agent, or Firm* — Mayer Brown LLP

(57) ABSTRACT

A system for interactive network access approval includes a server, a first application running on a first device for requesting access to a website on the network, and a second application running on a second device for approving access to the website. The server receives a request via the first application for access to the website, immediately transmits the request to the second application, receives via the second application approval for access to the website, and immediately grants access to the website to the first application. A method for granting access to a website is also described.

24 Claims, 21 Drawing Sheets

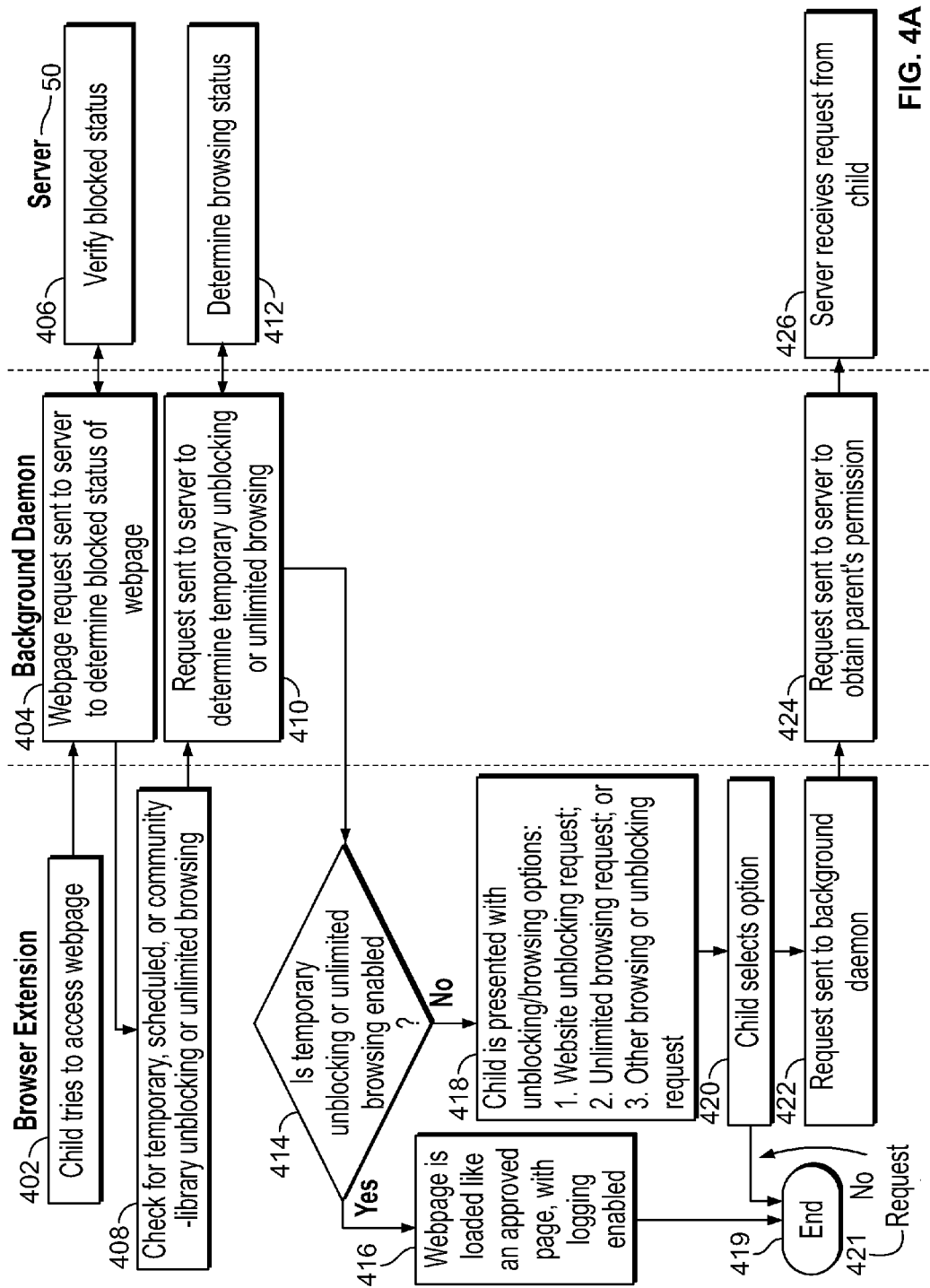

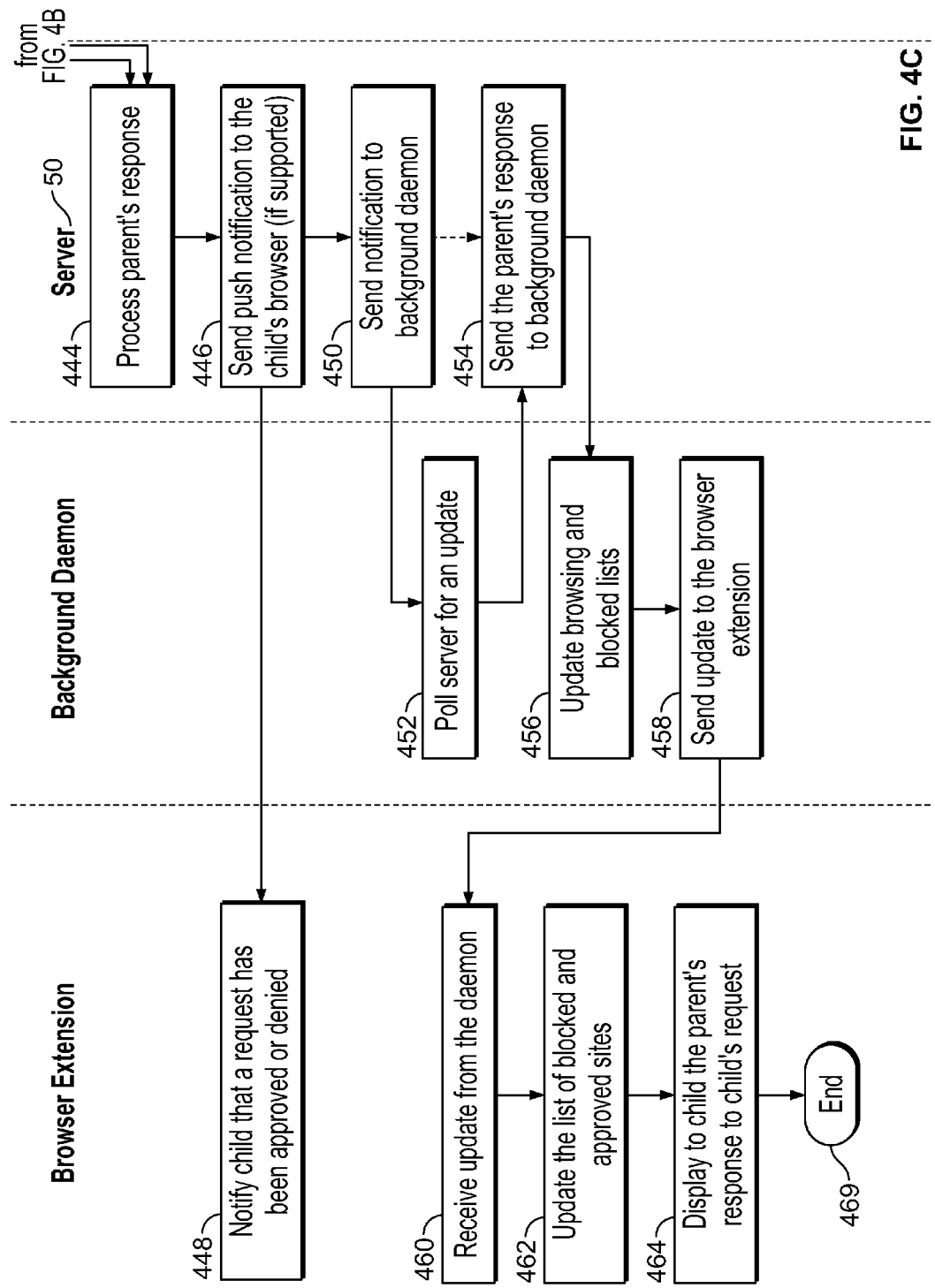

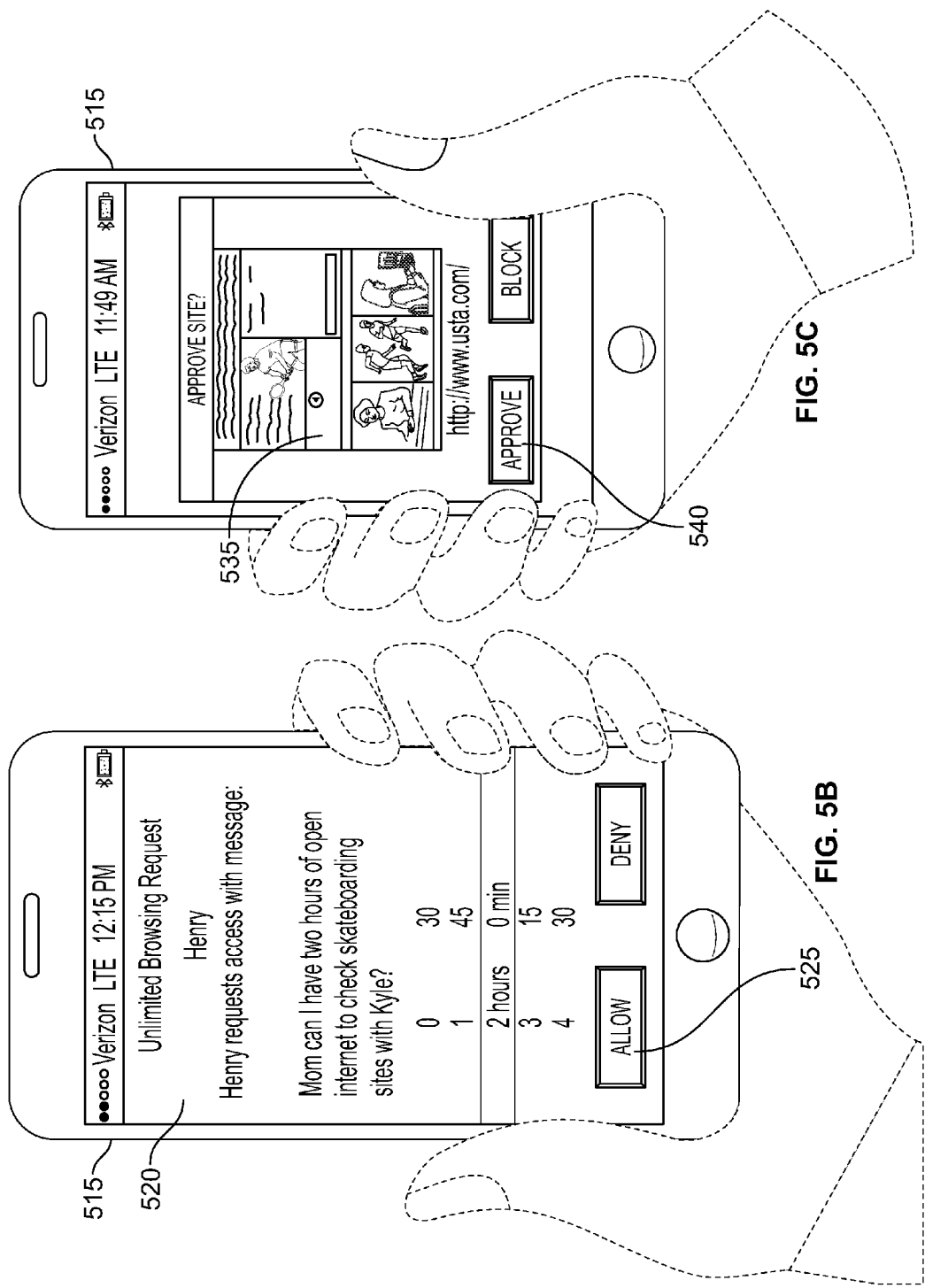

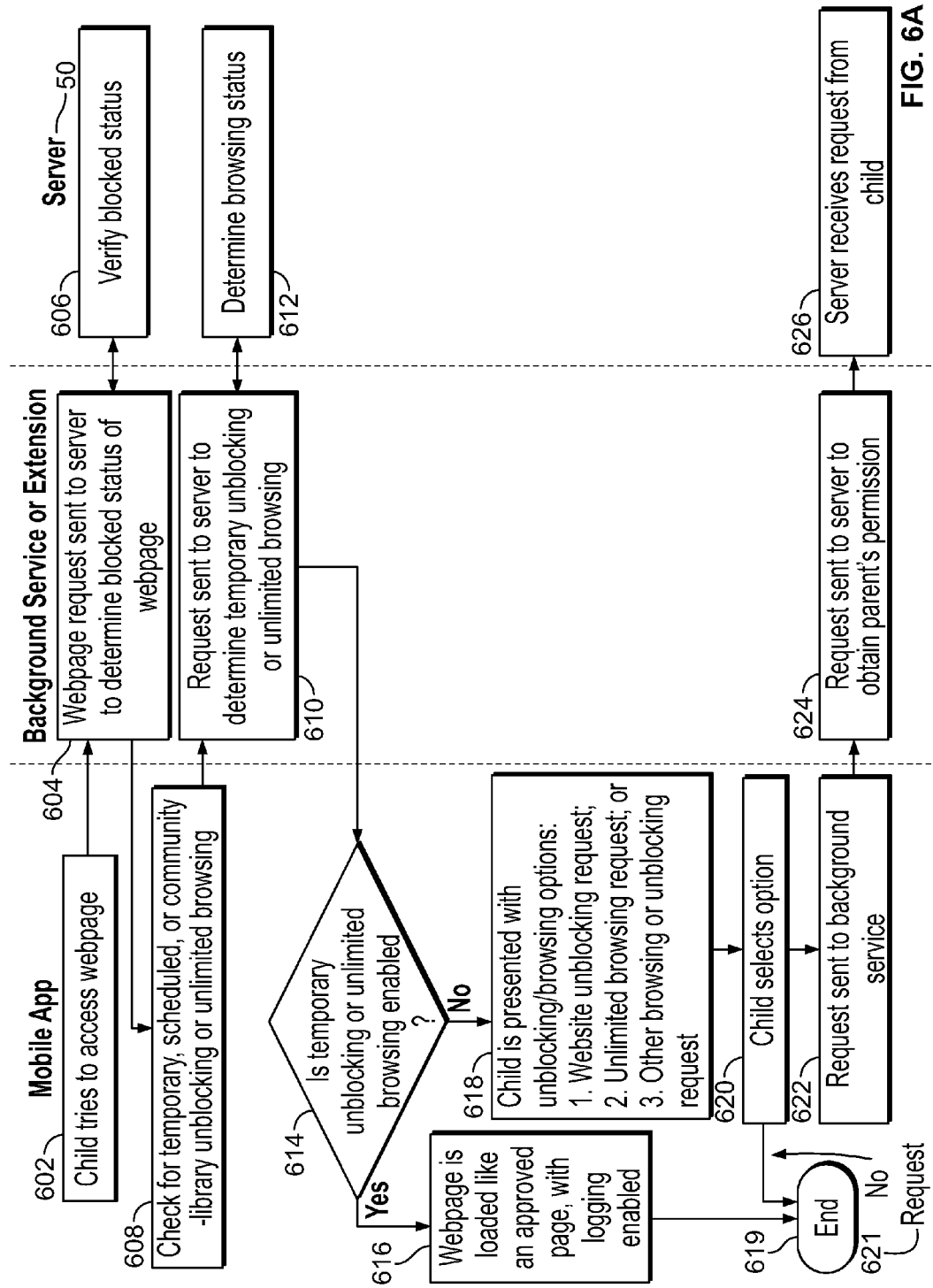

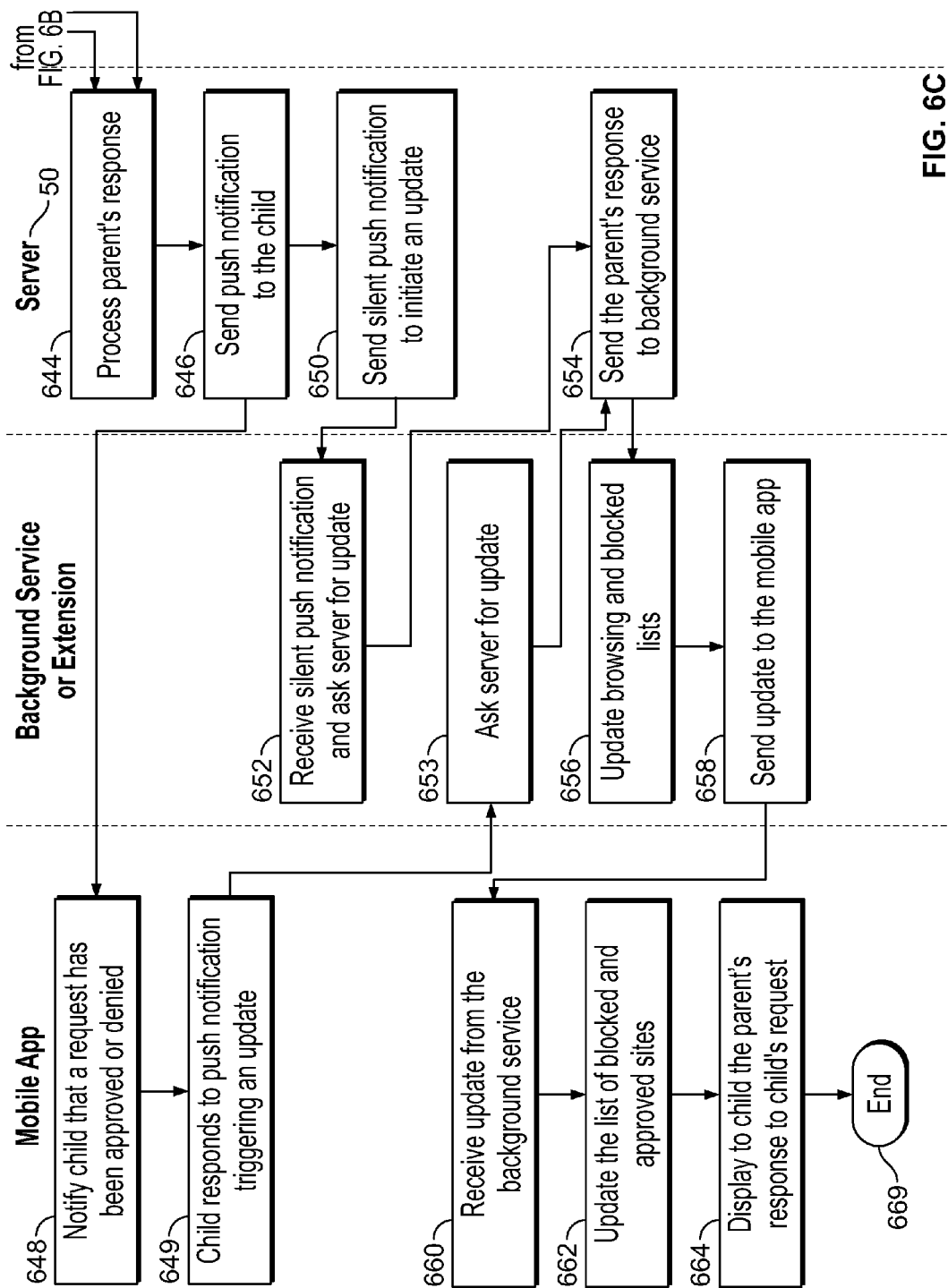

| ong's Browsing Activity | | |
|---|---|---|
| | URL | STATUS |
| 8:48 am | natureworkseverywhere.org | Permit? Y N |
| 8:48 am | biokids.org | Permit? Y N |
| 8:48 am | globalview.com | Permit? Y N |
| 8:48 am | smartearth.co | Permit? Y N |

FIG. 9B

SYSTEM AND METHOD FOR REMOTE, INTERACTIVE NETWORK AND BROWSING SUPERVISION, MONITORING, AND APPROVAL

BACKGROUND

For many parents, the Internet allows their children to have access to the world's information online. But as educational and beneficial as the Internet can be, many parents also believe that it is their responsibility to supervise their children online and to protect them from detrimental material. Today, many devices are so small and mobile that it is nearly impossible for parents to properly supervise their children online, and this problem is enhanced by dramatic increases in Wi-Fi availability and bandwidth. Some Internet protection applications allow parents to block children from viewing specific websites. Other applications allow children to view only specific websites. But these applications are often not very flexible, they frustrate the child-users by blocking sites and then requiring them to wait long periods for their parents to decide whether to approve them or not, and they are labor-intensive for the parents.

BRIEF DESCRIPTION OF THE DRAWINGS

FIG. 4A is a portion of a flowchart showing an unblocking process of the interactive system when the child is on a computer, as set forth in FIG. 4, according to an embodiment of the invention;

FIG. 4C is yet another portion of a flowchart showing an unblocking process of the interactive system when the child is on a computer, as set forth in FIG. 4, according to an embodiment of the invention;

FIGS. 5A-5F are screen shots taken during the unblocking process of FIG. 4;

FIG. 6A is a portion of a flowchart showing an unblocking process of the interactive system when the child is on a mobile device, as set forth in FIG. 6, according to an embodiment of the invention;

FIG. 6C is yet another portion of a flowchart showing an unblocking of the interactive system when the child is on a mobile device, as set forth in FIG. 6, according to an embodiment of the invention;

FIGS. 9A-9B are screen shots of activity reports with approval functions, according to embodiments of the invention.

Figure 1A:
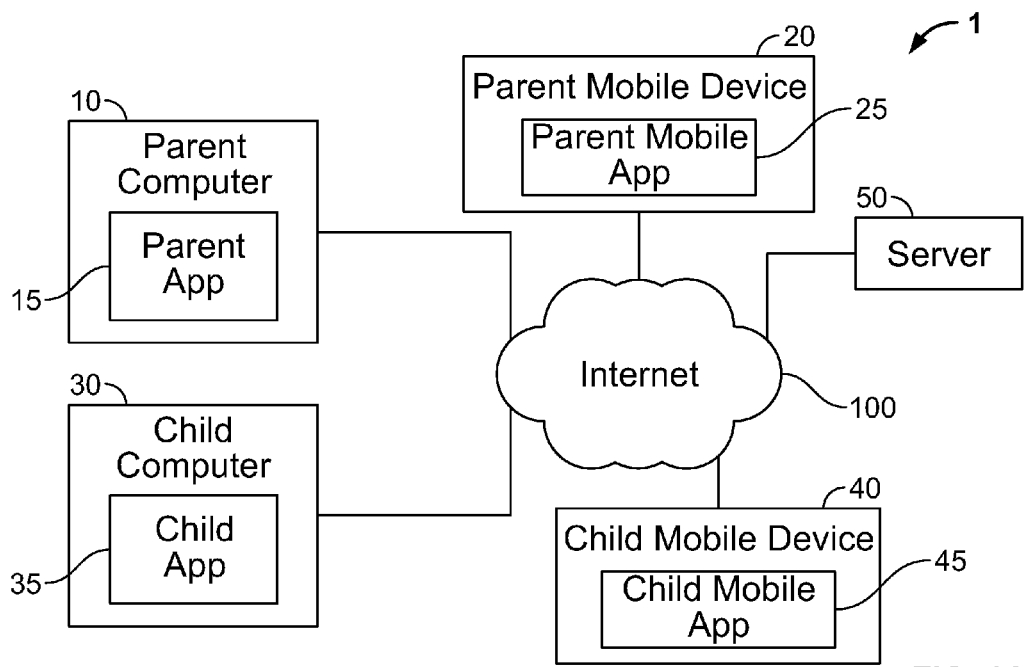
FIGS. 1A and 1B are conceptual block diagrams of a system for interactive network monitoring and approval, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used to protect children when accessing a network such as the Internet. Some functions include real-time approval mechanisms and up-to-the-minute activity reporting. In general, the application acts as a curator of the network for a child, providing a browsing environment that is both safe as well as optimized, while allowing a parent the ability to remotely monitor a child's browsing activity, remotely permit the child to access additional websites, and remotely add other privileges the parent wishes to further enhance the child's experience on the Internet.

Several features are included in the present invention. A parent signs a child up for the network monitoring software application (an example of which is currently called "Forcefield"). The application may include a default library of already-approved websites, possibly just one or a few websites from a limited number of categories. A parent may add a website to a child's personal library either directly from the child's computer or remotely from the parent's computer or the parent's mobile device(s). If the child tries to access a website not in the default library or personal library, the application will deny access and present to the child a message to that effect. The message may include an option to allow the child to ask the parent for instant permission to access the website. The request may be sent immediately to the parent, who may access it in a number of ways, either on the child's computer after entering a password, from the parent's desktop computer, or from the parent's mobile device(s), thus allowing the parent to immediately approve or deny the request. If approved, the child may then have instant access to the website requested without lengthy delay, and that website may then be added to the child's permanent personal library so that a request for that website need not be made again.

The present invention also includes the feature of granting the child the ability to browse unlimited websites (i.e., the "open Internet") for specific periods of time. This permission may be scheduled, e.g., 7-9 PM each weeknight, or on real-time or delayed request, and may also be granted in a variety of ways: directly on the child's computer after the parent enters a password, remotely from the parent's desktop computer, or remotely from the parent's mobile device(s).

The application may produce an activity report that shows all the child's network browsing activity, showing the parent which websites were visited and for how long, including whether the websites are in the default library or personal library, which sites were visited during sessions in which unlimited browsing privileges had been enabled, and which sites were visited during specific times of the day or week, such as late night, during school, during homework hours, or on the weekends. The report may consolidate activity from all of the child's devices—computer, smartphone, tablet, etc.

Reference is now made to FIG. 1A, which is a conceptual block diagram of a system 1 in which an apparatus for interactive network monitoring and approval may operate, according to an embodiment of the invention. Central to system 1 is the Internet 100, which acts as both the object whose access needs to be controlled and monitored as well as the network that allows such access to be directed. Connected to the Internet are parent computer 10, parent mobile device 20, child computer 30, and child mobile device 40, as well as server 50. Parent computer 10 runs parent app 15, parent mobile device 20 runs parent mobile app 25, child computer 30 runs child app 35, and child mobile device 40 runs child mobile app 45.

One embodiment of the present invention arranges devices that access the Internet into two main groups—"mobile devices" and "computers." A "mobile device" includes some of the following attributes. First, a mobile device may be designed to be portable and carried with the user at all times. For example, the device is primarily powered by a battery so it can be taken anywhere with the user. Second, a mobile device may have a persistent connection to the Internet while the device is powered on, and this connection is intended to keep the device connected to the Internet or another network. This connection may occasionally be disabled (e.g., placed in airplane mode), but is intended to be active during standard operating conditions. Third, a mobile device continues to operate even when put away or the screen is turned off. Such a device may have the ability to notify the user through sound, light, visual cues, vibration or other haptic feedback, etc. when new information comes to the device or changes are made on the device. Fourth, a mobile device is capable of running software applications. A software application may be an application available from an "app store" or other commercial venue, a custom application built for a device or class of devices, the mobile device's internal web browser, or some other provided environment on the mobile device where software can run.

In this embodiment, a "mobile device" may be contrasted with a "portable device"—although the portable device may operate primarily via a battery, and may access the Internet, e.g., via Wi-Fi, it may not have a persistent connection to the Internet. A portable device may become a mobile device, however, if the portable device were outfitted with a cellular antenna or operated in an area where Wi-Fi is substantially available everywhere the user would normally go, thereby providing the user with a persistent Internet connection.

Phone and computer manufacturers also often arrange devices into these two groups. For example, Apple® and other phone and e-reader manufacturers use iOS, Android®, BlackBerry®, Windows® Mobile, Windows® Phone, or Symbian® operating systems for phones and tablets and OS X and Windows® for desktop computers and laptops.

Under these definitions, a computer (e.g., parent computer 10 and child computer 30) may include, for example, a desktop computer, a laptop computer, a netbook computer, and a phone or a tablet that accesses the Internet via Wi-Fi only. The common characteristic among these devices is that they do not have a persistent connection to the Internet and may not operate when put away or when the screen is turned off—a laptop computer with its cover closed is an example of this.

Under these definitions, a mobile device (e.g., parent mobile device 20 and child mobile device 40) may include, for example, a phone, smartphone, tablet, personal digital assistant (PDA), e-reader, or wearable computer that operates primarily via battery on the cellular network (e.g., 3G, 4G, LTE). A mobile device may also include some of the devices included in the "computer" group above, such as a phone or a tablet that uses Wi-Fi if the device includes a cellular antenna or is operated in an area where Wi-Fi is completely available everywhere the user would normally go, thereby providing the user with a persistent Internet connection.

And even though FIG. 1A shows parent app 15 on parent computer 10 and parent mobile app 25 on parent mobile device 20, a parent may access the parent app and parent mobile app on a child computer or child mobile device, and a child may access the child app or child mobile app on the parent computer or parent mobile device. Moreover, parent app 15, parent mobile app 25, child app 35, and child mobile app 45 may be the same app, that is they may look alike and be accessed in the same way, but may become differentiated when the respective parent or child enters identifying information such as a username and password. Server 50 controls the operation of the parent and child apps so that the parent app (and mobile app) may monitor and approve the child's access to the Internet.

Although the Internet is shown in FIG. 1A, cloud 100 is representative of any network whose access is not fully controlled, such as a wide-ranging intranet or private network. Access to the Internet or network may be wireless or wired, or a combination, and may be short-range or longer range, via satellite, telephone network, cellular network, Wi-Fi, over public or private networks, via Ethernet, or over local, wide, or metropolitan area networks (i.e., LANs, WANs, or MANs).

Figure 1B:
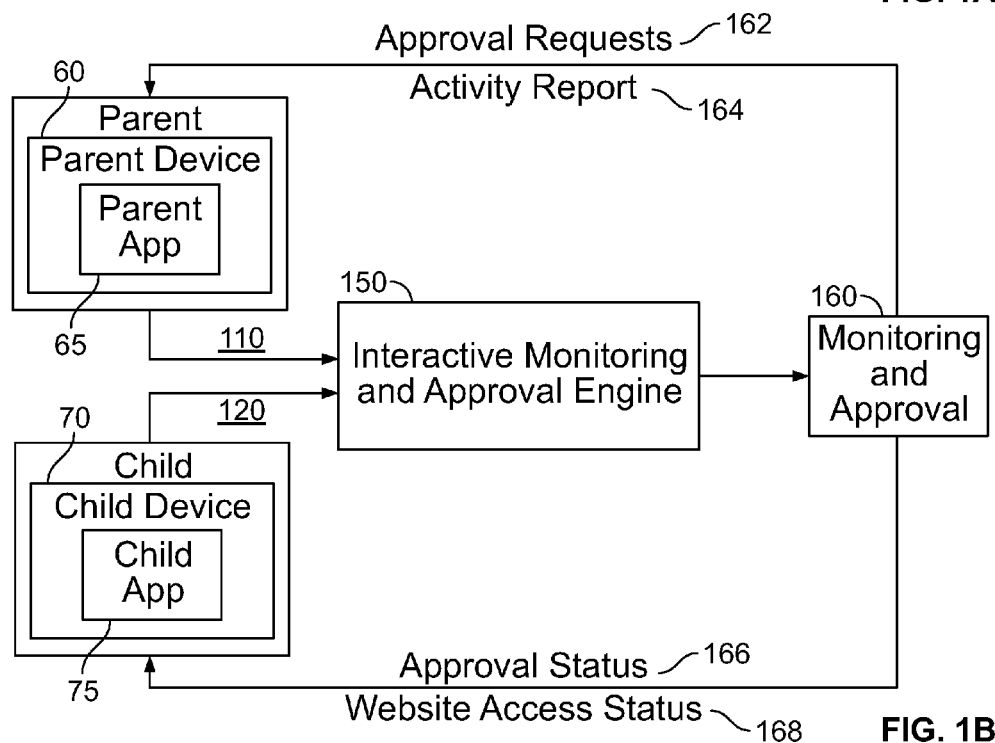

FIG. 1B is another conceptual block diagram of the system of FIG. 1A, according to an embodiment of the invention. FIG. 1B shows the interaction among a parent, a child, and interactive monitoring and approval engine 150, which may reside in server 50.

A parent, using parent device 60 to access parent app 65, may send commands and information 110 to interactive monitoring and approval engine 150. Parent device 60 may include parent computer 10 and parent mobile device 20; parent app 65 may include parent app 15 and parent mobile app 25. Information may include items the parent transmits to set up a user profile for the parent and his or her family. Such information may include name, address, age, authentication credentials (e.g., username and password), payment information, family information, information about various devices the parent may use to access the Internet, etc. Commands may include items the parent transmits to allow or deny access to a website to a child (e.g., approvals or denials) or requests the parent may make for information from engine 150, such as for an activity report 164.

A child, using child device 70 to access child app 75, may send requests and information 120 to interactive monitoring and approval engine 150. Child device 70 may include child computer 30 and child mobile device 40; child app 75 may include child app 35 and child mobile app 45. In the child's case, information may include items the child transmits to set up preferences within the framework set up by the parent. Such preferences may include authentication credentials (e.g., username and password), likes, dislikes, authentication information for other websites the child is permitted to access, information about various devices the child may use to access the Internet, etc. Requests may include items the child transmits to request permission to access a website or the Internet.

In one embodiment, child app 75 acts as a front end to the Internet or as the child device 70's Internet browser, so that the child may not access the Internet without going through the app. This may differ from parent app 65, which may act as an application distinct from an Internet browser, that allows the parent to create profiles and grant approvals for their children, but which does not control the parent's own access to the Internet. In another embodiment, however, the parent may desire parent app 65 to act as an Internet browser.

Interactive monitoring and approval engine 150 may receive commands and information 110 from the parent and requests and information 120 from the child. Engine 150 compiles information about the websites the child accesses (or tries to access), including the URL (uniform resource locator or address), the times the website is accessed, and the amount of time the website is visited by the child, among other information. Engine 150 also denies access to websites that the child is not allowed to access, because the website is not in the default library or the child's personal library, and the child is not accessing the website during a period of unlimited browsing. As part of the monitoring functionality of engine 150, the engine may indicate website access status 168 to the child (whether the child has permission to access a particular website) as a message to the child or on the screen of the child app. The engine may also produce activity report 164 and transmit it to the parent. As part of the approval functionality of engine 150, the engine may receive requests for access from the child and transmit approval requests 162 to the parent. If the parent allows or denies access, engine 150 may transmit such approval status 166 to the child.

Figure 2A:
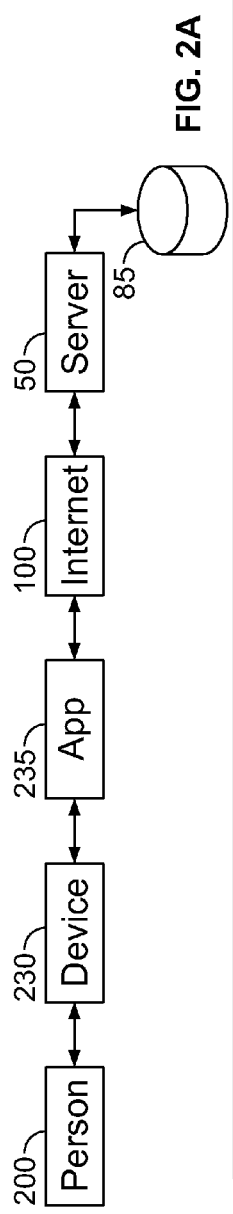
FIG. 2A is a flow diagram showing another way of viewing the interactions among the blocks in FIGS. 1A and 1B, according to an embodiment of the invention.
Figure 2B:
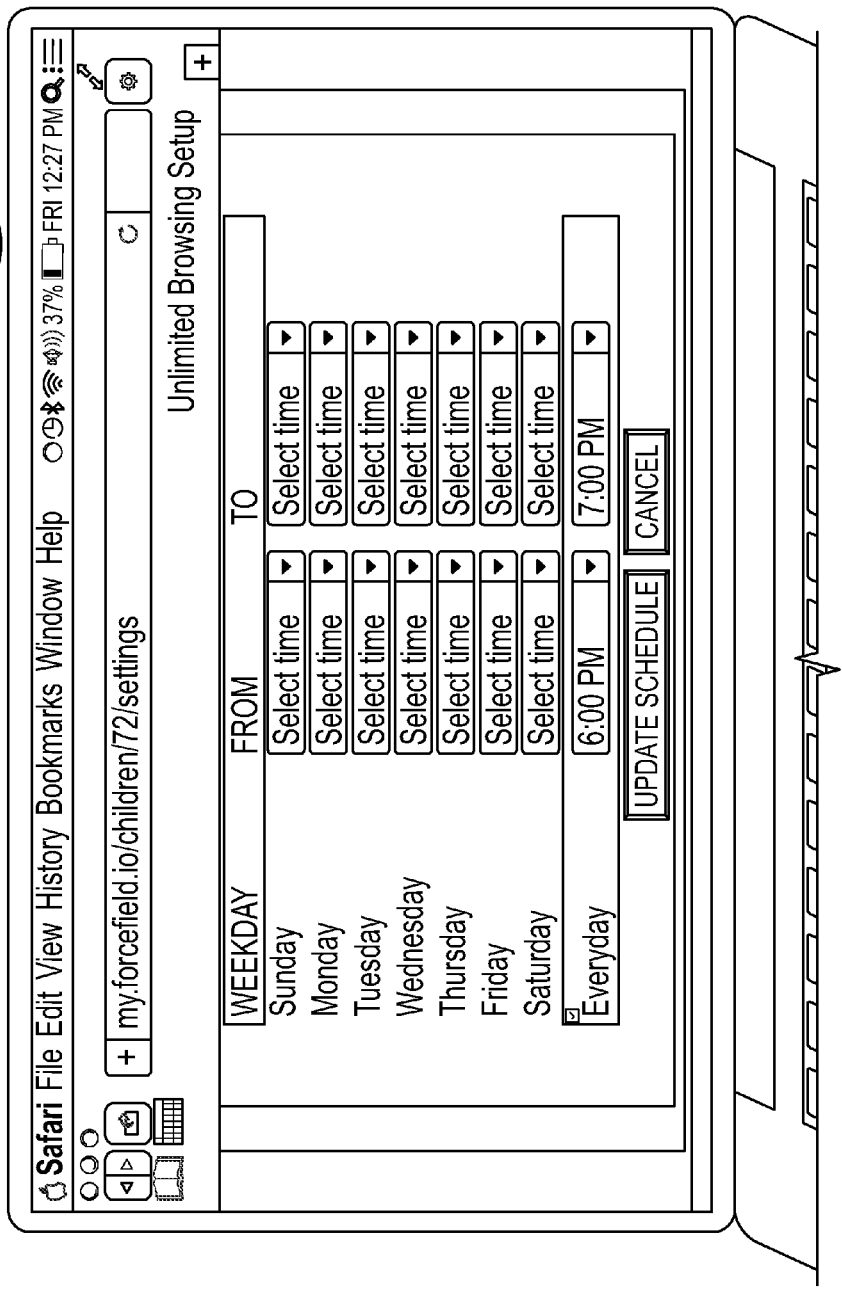
FIG. 2B is screen shot showing the setup of a session of unlimited browsing for a child, according to an embodiment of the invention.

Reference is now made to FIG. 2A, which is a flow diagram showing another way of viewing the interactions among the blocks in FIGS. 1A and 1B, according to an embodiment of the invention. FIG. 2A includes a person 200, which could be the parent or the child, parent or child device 230, parent or child app 235, Internet 100, server 50, and database 85. In one scenario, person 200 is the parent who, using device 230, accesses app 235 to interact with server 50 over the Internet. The parent may set up the profile, provide registration information, enter a list of initially approved websites and unlimited browsing windows, and grant or deny approvals to the child's requests. For example, FIG. 2B is a screen shot showing a parent setting up and enabling periods of unlimited browsing either on an open-ended or a scheduled basis. Server 50 receives such information, approvals, and denials from the parent and saves information in a parent profile and/or a child profile in database 85. Server 50 also keeps track of websites accessed and attempted to be accessed by the child, access times, and total time visited and may also save that information in database 85. Server 50 may transmit back to the parent via the Internet, app 235, and device 230 the activity report and any approval requests.

In another scenario, person 200 is the child who, using device 230, accesses app 235 to interact with server 50 over the Internet. The child may provide authentication information to server 50, augment his or her profile to include preferences, and, if child app 75 acts as the child's Internet browser, the child may transmit URLs to server 50 to access or attempt to access websites. Server 50 receives such information and URLs from the child and saves the information in the child profile in database 85. Server 50 grants access to websites that are already approved, sends messages back to the child if access is denied, and provides a mechanism for the child to request access to unapproved websites. As with the parent scenario, server 50 keeps track of websites accessed and attempted to be accessed by the child, access times, and total time visited, saving that information in database 85. The server may also make recommendations to the child based on the child's likes and dislikes and the child's approved websites. Server 50 may transmit back to the child via the Internet, app 235, and device 230 the status of any approval requests (e.g., allowed, denied, still pending).

The blocks shown in FIGS. 1A, 1B, and 2A are examples of modules that may comprise system 1, computers 10 and 30, mobile devices 20 and 40, devices 60 and 70, apps 15 and 35, mobile apps 25 and 45, and apps 65 and 75 and do not limit the blocks or modules that may be part of or connected to or associated with these modules. For example, as mentioned above, parent app 15, parent mobile app 25, child app 35, and child mobile app 45 may be the same app but located on different devices. Also, as described above, a device may act as a "computer" sometimes and a "mobile device" at other times depending on how mobile the device is and how persistent its Internet connection is. In FIG. 1B, monitoring and approval 160 are located outside of interactive engine 150, but may instead be part of engine 150. And outputs 162-168 are not the only outputs of the engine 150. The blocks in FIGS. 1A, 1B, and 2A may be implemented in software or hardware or a combination of the two, and may include processors, memory, and software instructions executed by the processors.

Figure 3:
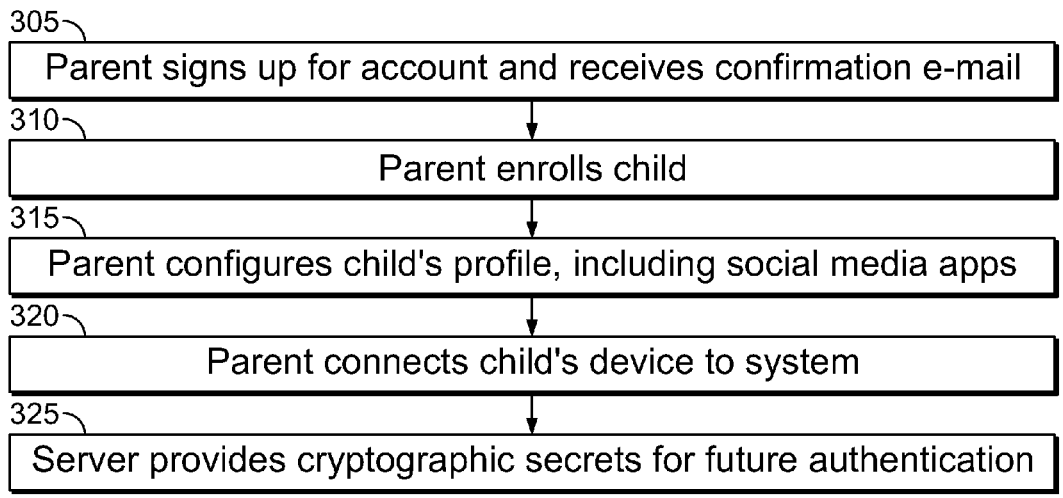
FIG. 3 is a flowchart illustrating a process for setting up the child to use the system of the present invention.

Reference is now made to FIG. 3, which is a flowchart of a process for setting up a child to use the system of the present invention. In operation 305, a parent signs up for an account on the website for the engine 150. Such sign-up may include e-commerce and agreeing to terms and conditions. The parent may then be sent a confirmation email to verify the email address, such as by clicking on a link in the email.

In operation 310, the parent may enroll a child. The parent may provide the child's name and date of birth (which determines age and is used to place the child in an appropriate age range). In operation 315, the parent configures the child's account, which may be performed on a desktop computer or on a mobile device, including a smartphone, tablet, or laptop computer. The parent may be given the option to connect the child's profile to the child's social media accounts for monitoring. This process may involve selecting the service (e.g., Facebook, Instagram, Snapchat, Twitter, etc.) and logging into the child's social media account to connect it to the app.

In operation 320, the parent may then connect the child's device (computer or smartphone, tablet, phone, etc.) to the system. The parent downloads the child app for the specific device and installs it. Upon launching for the first time the parent is requested to log in to his or her account to connect the device to the specific child (or children) that will be using that device. In operation 325, as part of the connection process, the server 50 may provide cryptographic secrets to the device in order for it to authenticate itself with the server. Separate tokens may be provided for passing data to the application programming interface (API) on usage, requests, and blocking and for the child's access to a dashboard and search functions. The installation on the device is confirmed and the child is able to start using the device.

Real-Time, Immediate Website Request and Approval

Figure 4:
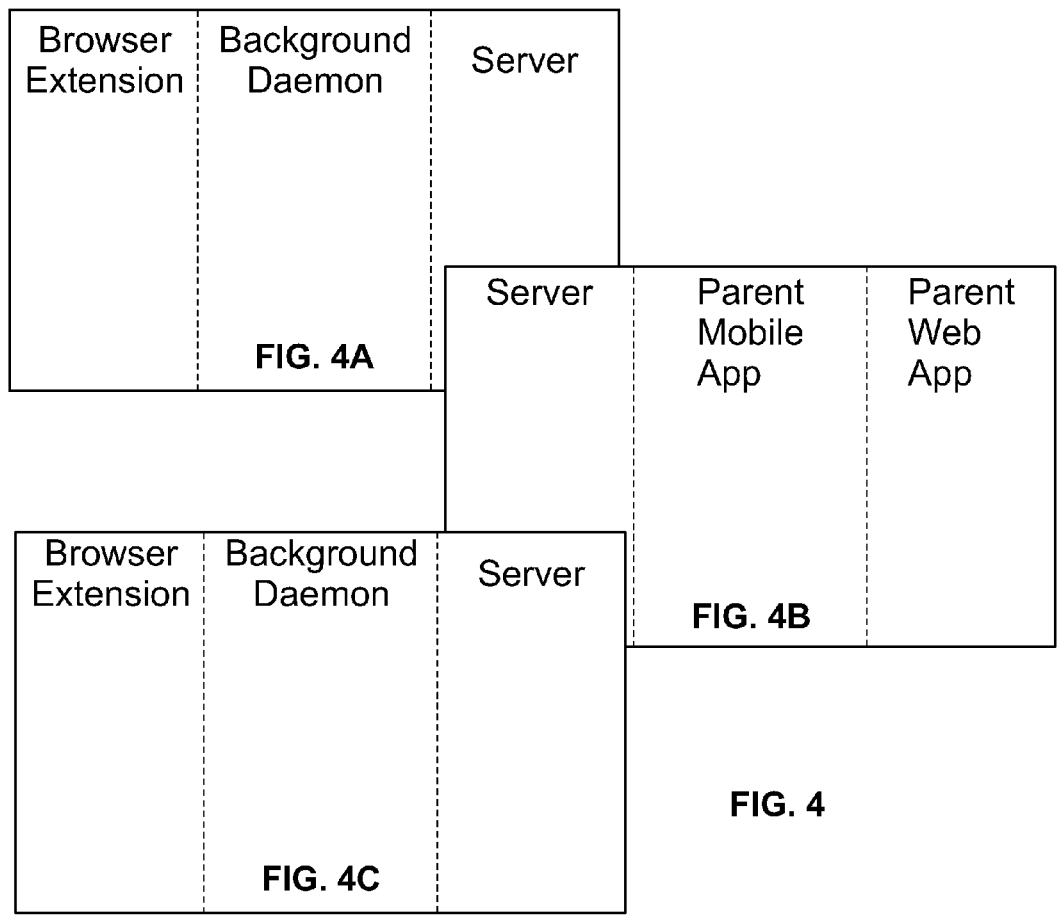
FIG. 4 is a flowchart showing an unblocking process of the interactive system when the child is on a computer, showing the relationship between FIGS. 4A-4C, according to an embodiment of the invention.
Figure 4B:
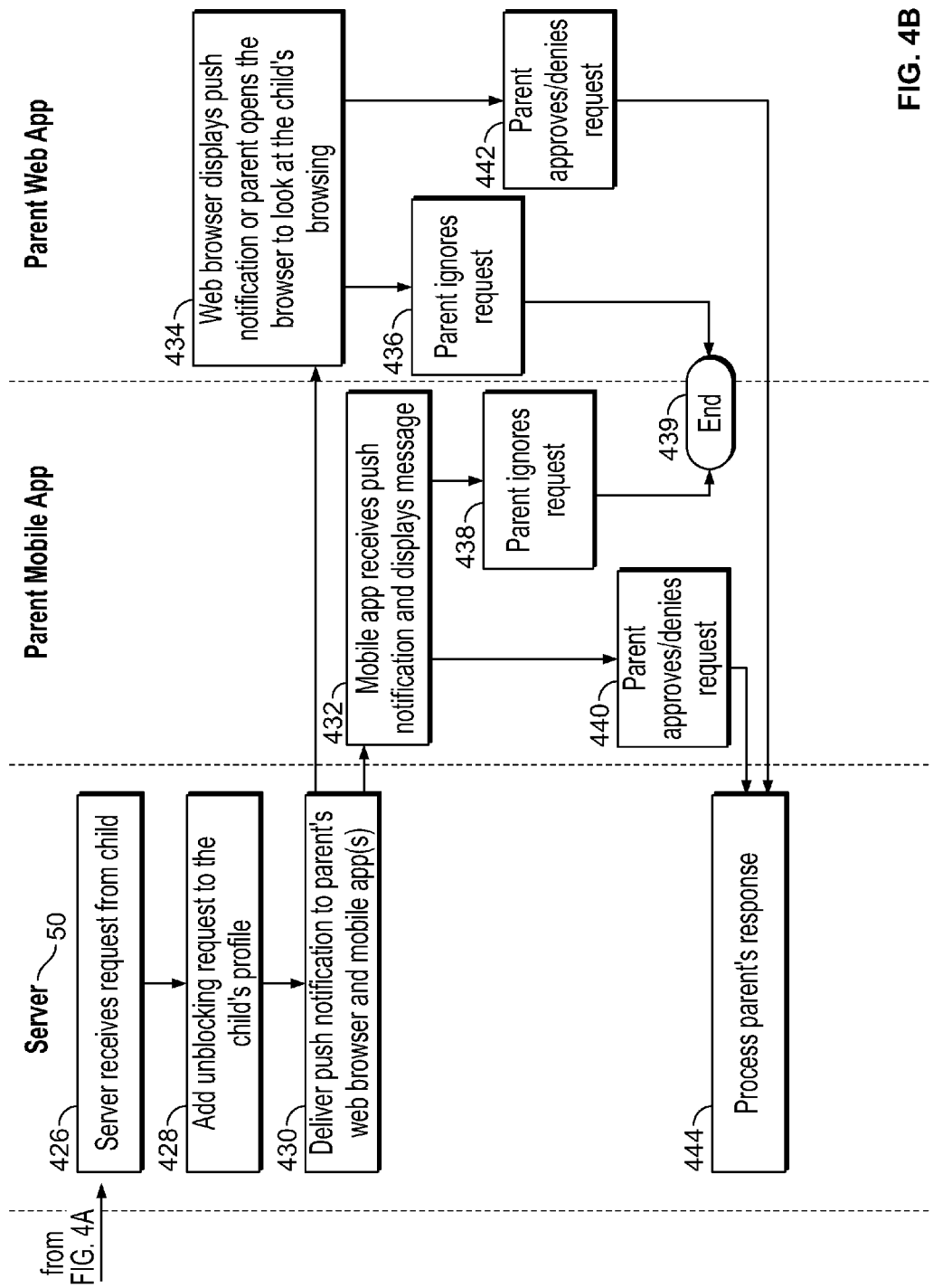
FIG. 4B is another portion of a flowchart showing an unblocking process of the interactive system when the child is on a computer, as set forth in FIG. 4, according to an embodiment of the invention.

Reference is now made to FIG. 4, which is a flowchart showing an unblocking and approval process of the interactive system when the child is on a computer, according to an embodiment of the invention. The flowchart is split into three parts, FIG. 4A, FIG. 4B, and FIG. 4C, as laid out in FIG. 4. Overall, the flowchart has five headings: Browser Extension, Background Daemon, Server, Parent Mobile App, and Parent Web App. These headings reflect which portion of hardware or software may perform each operation. A browser extension is code that is loaded by a web browser and run while the web browser is operating. It has access to information from the browser while it is being used. In this embodiment, the browser extension allows the app to intercept web traffic and filter it, take over search requests, and report back on time spent browsing the web. Most desktop browsers support extensions in one form or another. A background daemon monitors the browser extension, stores security credentials and other information about the current child and the parent, and proxies information between the client and the server (and vice versa). It enforces security policies (such as disabling other web browsers) since it can operate with privileges and abilities outside of the "sandbox" in which modern browsers operate. The browser extension passes requests to the daemon and the daemon fulfills the request via the server, which may be server 50. The parent mobile and web apps reflect the possibility that a child's request will be sent to both the parent's computer and mobile device(s) so that the parent may respond quickly to the request.

In operation 402, a child tries to access a website or a webpage. In operation 404, the background daemon sends the webpage access request to the server to determine the blocked status of the webpage, and, in operation 406, the server verifies it is blocked—the webpage is not in the default library or the child's personal library. In operation 408, the browser extension checks to see whether there may be a temporary unblocking, a scheduled unblocking, or a community-library unblocking for that webpage or whether unlimited browsing is in effect. A community library may be set up by the application administrator as a forum for those who have accounts with the approval service to share websites. These would be in addition to the websites in the default library. The community library may include hundreds or thousands of websites recommended by users of the system, but not specifically approved by the system administrator. For these sites, there may be an intermediate type of temporary unblocking—the child may look only one time (or a few times at most) for a few minutes (perhaps 1-5) to see whether the site is worthwhile asking approval for from a parent. The system will monitor access attempts and browsing time at the site in accordance with its rules.

In operation 410, the background daemon sends the child's request to the server, and in operation 412, the server determines the browsing status for that page. In operation 414, the browser extension asks whether temporary, scheduled, or community-library unblocking for the webpage or unlimited browsing is enabled. If so, in operation 416, the webpage is loaded like an approved page, logging (monitoring) is enabled for that webpage, and the flow ends at 419. As mentioned above, if the website access is allowed only because the website is in the community library, browsing may be limited to one time only and only for a few minutes.

Figure 5A:
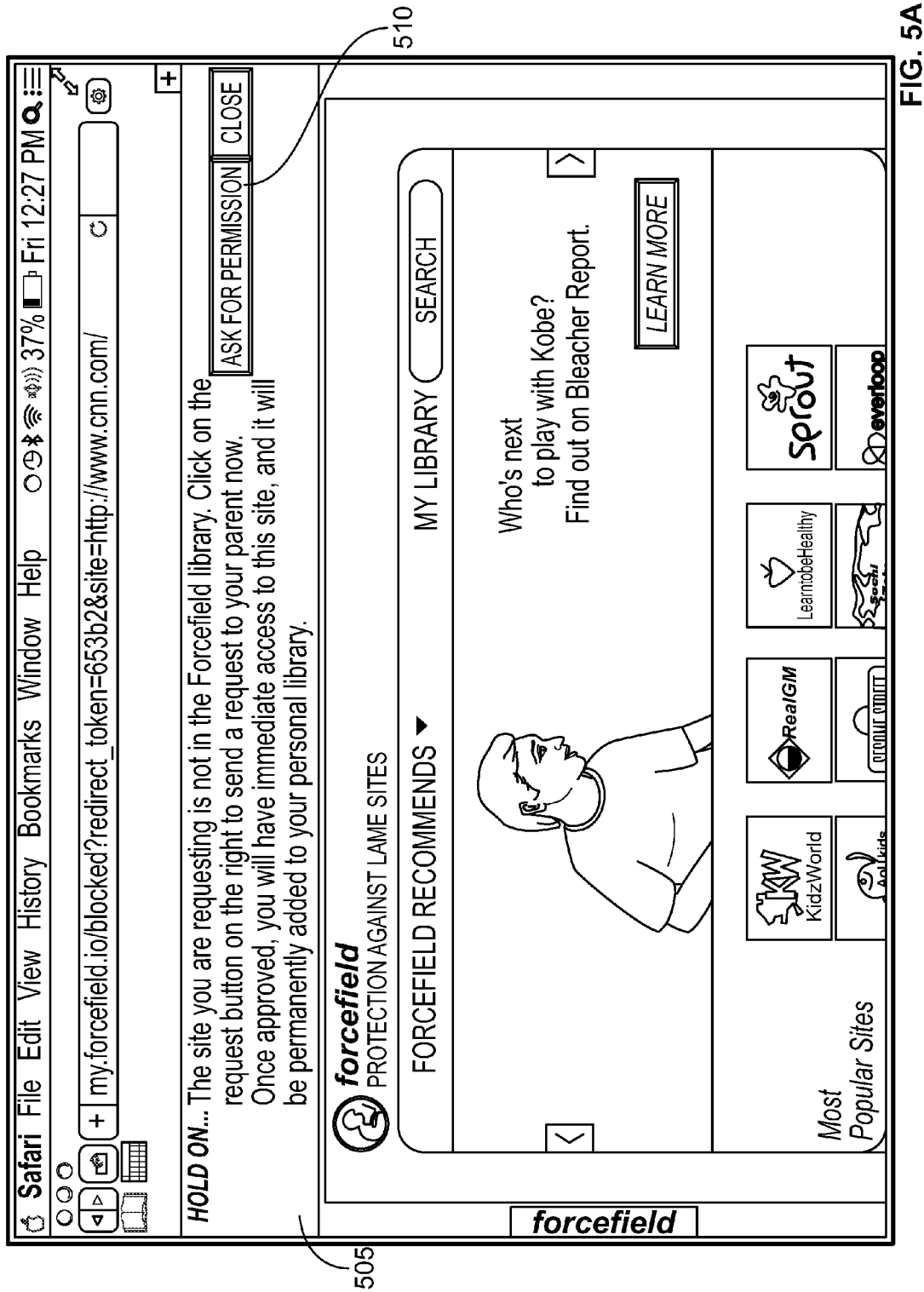

If in operation 414, temporary, scheduled, or community-library unblocking for the webpage or unlimited browsing are not enabled, then in operation 418, the child is presented with unblocking/browsing options. These options may include a website unblocking request, an unlimited browsing request, or another browsing or unblocking request. A website unblocking request is a request from a child to permanently unblock a website and add it to the child's personal library (i.e., list of available websites). An unlimited browsing request is a request from a child to temporarily allow access to all websites, but the server still continues to monitor the child's usage. FIG. 5A is a screen shot showing a message 505 the child may receive from the server if the child tries to access a website not in the default library or the child's personal library. The message may state, "HOLD ON ... The site you are requesting is not in the default library. Click on the request button on the right to send a request to your parent now. Once approved, you will have immediate access to this site, and it will be permanently added to your personal library." As stated in the message, the child may click request button 510 on the screen to seek permission for immediate access.

In operation 420, the child selects an unblocking/browsing option. (If the child does not select an option, then the flow continues to "no request" 421 and ends at 419.) An unlimited browsing request may include a time frame for browsing, e.g., 2 hours, which may be set "on the fly." In operation 422, the request is sent to the background daemon, which, in operation 424, sends the request to the server to obtain the parent's permission, and in operation 426 the server receives the request from the child. In operation 428, the server adds the unblocking/browsing request to the child's profile. In operation 430 a push notification is delivered to the parent's web browser and mobile app(s) (if they exist), and these show up immediately in the parent mobile app in operation 432 and in the parent web browser in operation 434. The app and web browsers display a message to the parent that the child has made a request; in the web browser, the parent may alternatively open the browser to look at the child's browsing. The parent, in operations 436 or 438, may ignore the request, in which case the flow ends at 439. The parent may also allow or deny the request in operations 440 or 442, and the server processes the parent's response in operation 444.

FIG. 5B is a screen shot showing an unlimited browsing request 520 on a parent's mobile device 515. In this example, the child asks for 2 hours of unlimited browsing time and provides a reason for the request. The parent may allow or deny the request 525, or may modify the requested period of time. FIG. 5C is a screen shot showing an unblocking request 535 on the parent's mobile device 515. In this example, the child asks the parent to approve the website, and the site's home page (or some other relevant page) may be shown to the parent. The parent may be provided a link so that he or she may peruse the website before granting or denying access. The parent may allow or deny (approve or block) the website 540.

Referring now to FIG. 4C, in operation 446, the server may immediately send a push notification to the child's browser, if such a notification is supported by the browser. In operation 448, the browser extension may instantly notify the child that the request has been approved or denied. This may be a simple text message to inform to the child that the permissions have changed. In operation 450, the server sends a notification to the background daemon, and in operation 452 the background daemon may poll the server for an update. Any of the local information may be updated on the server at any time. This might be as simple as the child's name or might be additions to the personal library or might be changes to the default library, etc. In operation 454, the server sends the parent's response to the background daemon. (The dashed arrow between operations 450 and 454 indicates that there may be a situation in which the push notification fails being sent, is lost, is overwritten by a subsequent push notification, or is otherwise not received. The non-push notification may be time delayed by up to 30 seconds (while the push should be almost instant), but is a fail-safe.) In operation 456, the background daemon updates the browsing and blocked lists based on the parent's response, and in operation 458 sends the update to the browser extension. In operation 460, the browser extension receives the update from the background daemon, updates the list of blocked and approved sites in operation 462, and displays to the child the parent's response to the child's request in operation 464. This message differs from the one in operation 448 because this message indicates the actual completion of the change on the client and the subsequent update to the user experience (UX) corresponding to the local change. The flow then ends at 469.

Figure 5D:
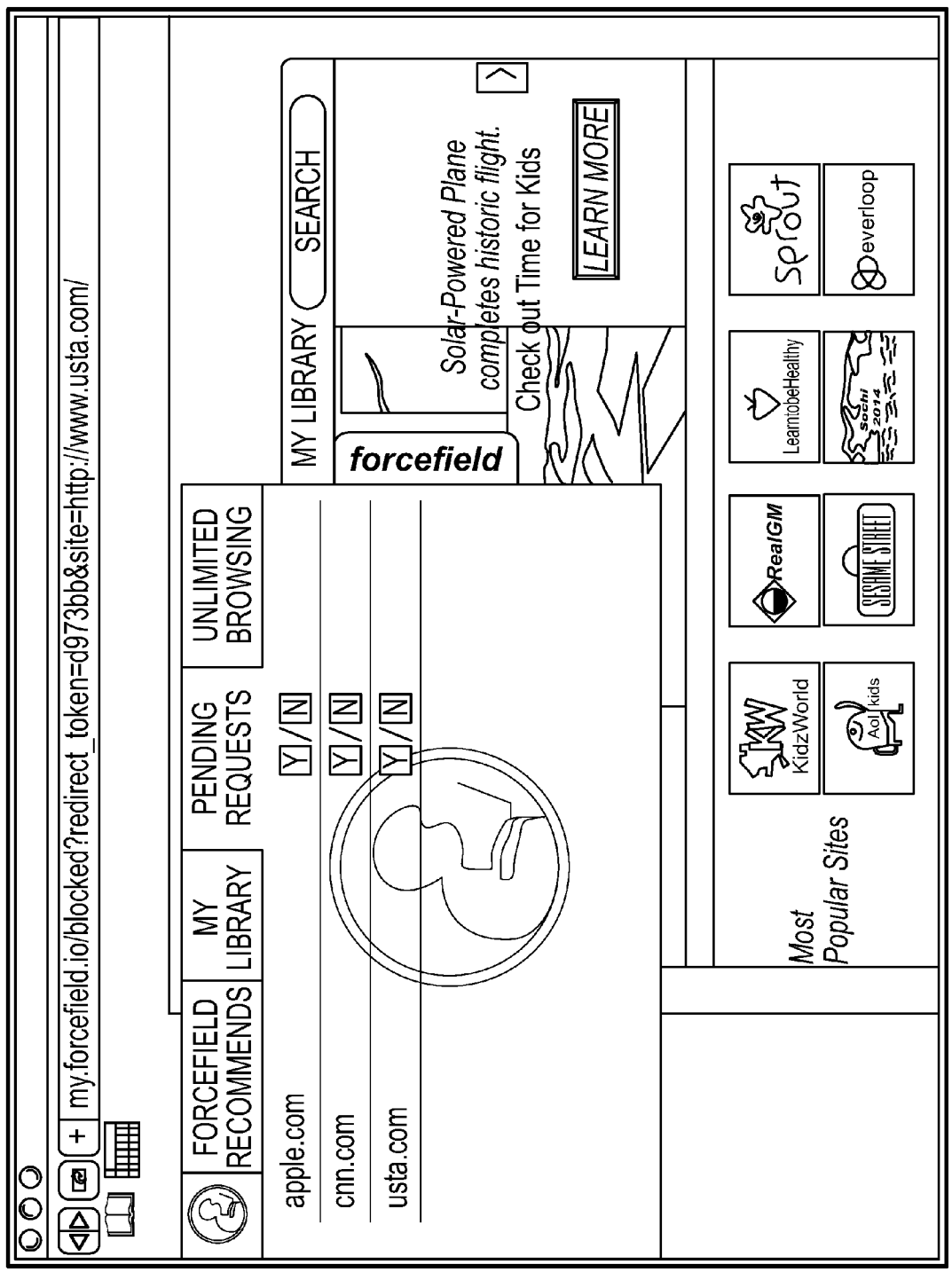
Figure 5E:
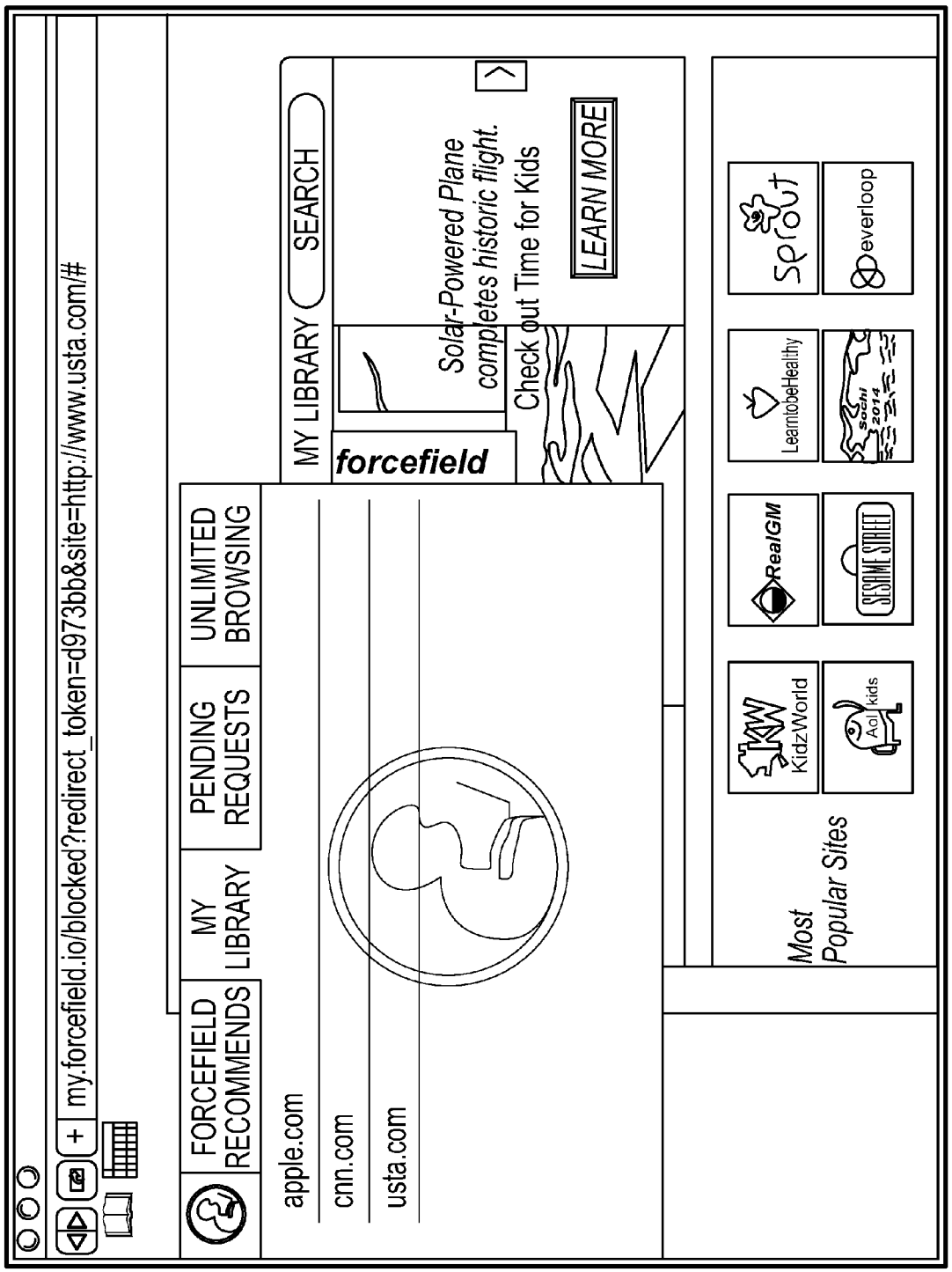
Figure 5F:
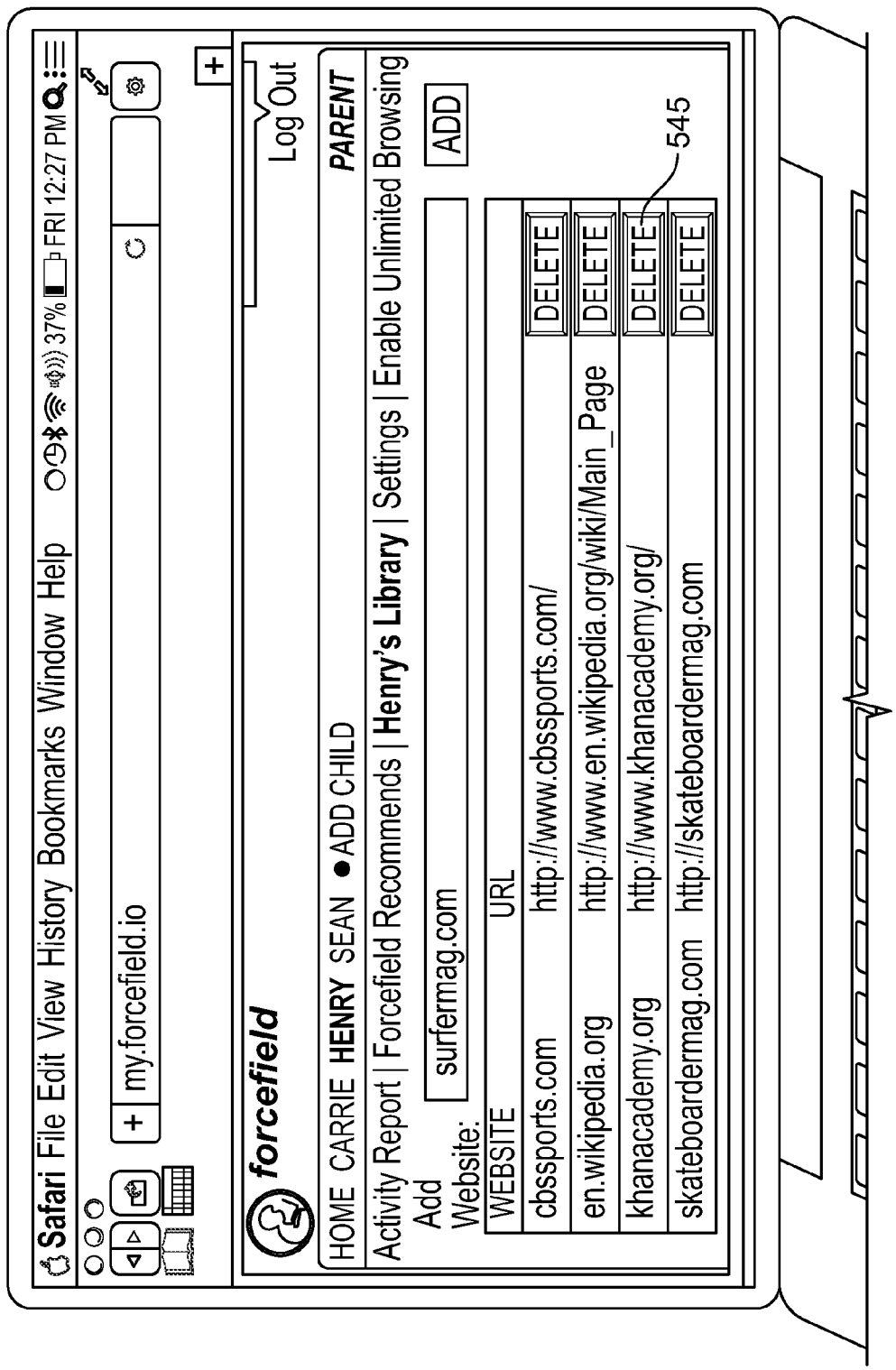

FIG. 5D is a screen shot showing pending requests on the child's app, so the child may monitor the status of those requests. FIG. 5E is a screen shot after the requests have been approved showing that websites are now part of the child's personal library. FIG. 5F is a screen shot of the parent's app showing some of the child's approved websites. There may also be a button 545 that allows the parent to delete access to the site, even after the parent had earlier approved it.

Figure 6:
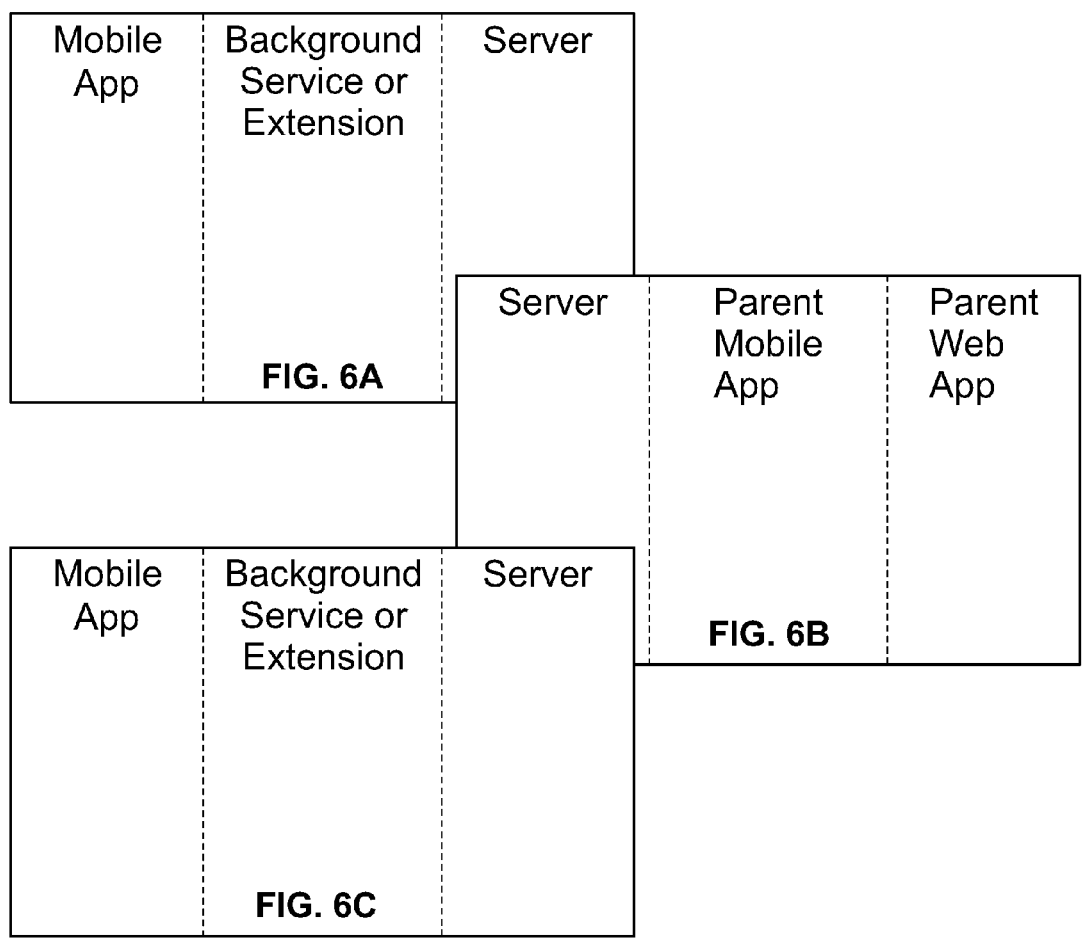
FIG. 6 is a flowchart showing an unblocking process of the interactive system when the child is on a mobile device, showing the relationship between FIGS. 6A-6C, according to an embodiment of the invention.

Reference is now made to FIG. 6, which is a flowchart showing an unblocking and approval process of the interactive system when the child is on a mobile device, according to an embodiment of the invention. As with FIG. 4, the flowchart is split into three parts, FIG. 6A, FIG. 6B, and FIG. 6C, as laid out in FIG. 6. Again, the flowchart has five headings: Mobile App (instead of Browser Extension in FIG. 4), Background Service or Extension (instead of Background Daemon in FIG. 4), Server, Parent Mobile App, and Parent Web App. As with FIG. 4, these headings reflect which portion of hardware or software is performing each operation. The mobile app is a software application that runs on the child's mobile device. In a mobile app, a background daemon typically does not exist, so a background service or extension is run as a separate process inside the app to communicate with the server. The background service or extension typically has the same permissions as the mobile app. The server and the parent mobile and web apps are the same as in FIG. 4.

Because FIGS. 4 and 6 are similar, only the differences will be discussed in detail. In FIG. 6A, the child, while on his or her mobile device, tries to access a webpage in operation 602. After the server verifies that the webpage is blocked in operation 606, it then determines in operation 612 whether the page is allowed as part of an unlimited browsing period or a temporary, scheduled, or community-library unblocking of the site. If so, the webpage is delivered to the child and the activity is logged in operation 616. If the webpage is blocked, then the child is presented in operation 618 with options to request access to the site or request a period of unlimited browsing, and the request is forwarded to the server in operations 622-626.

Figure 6B:
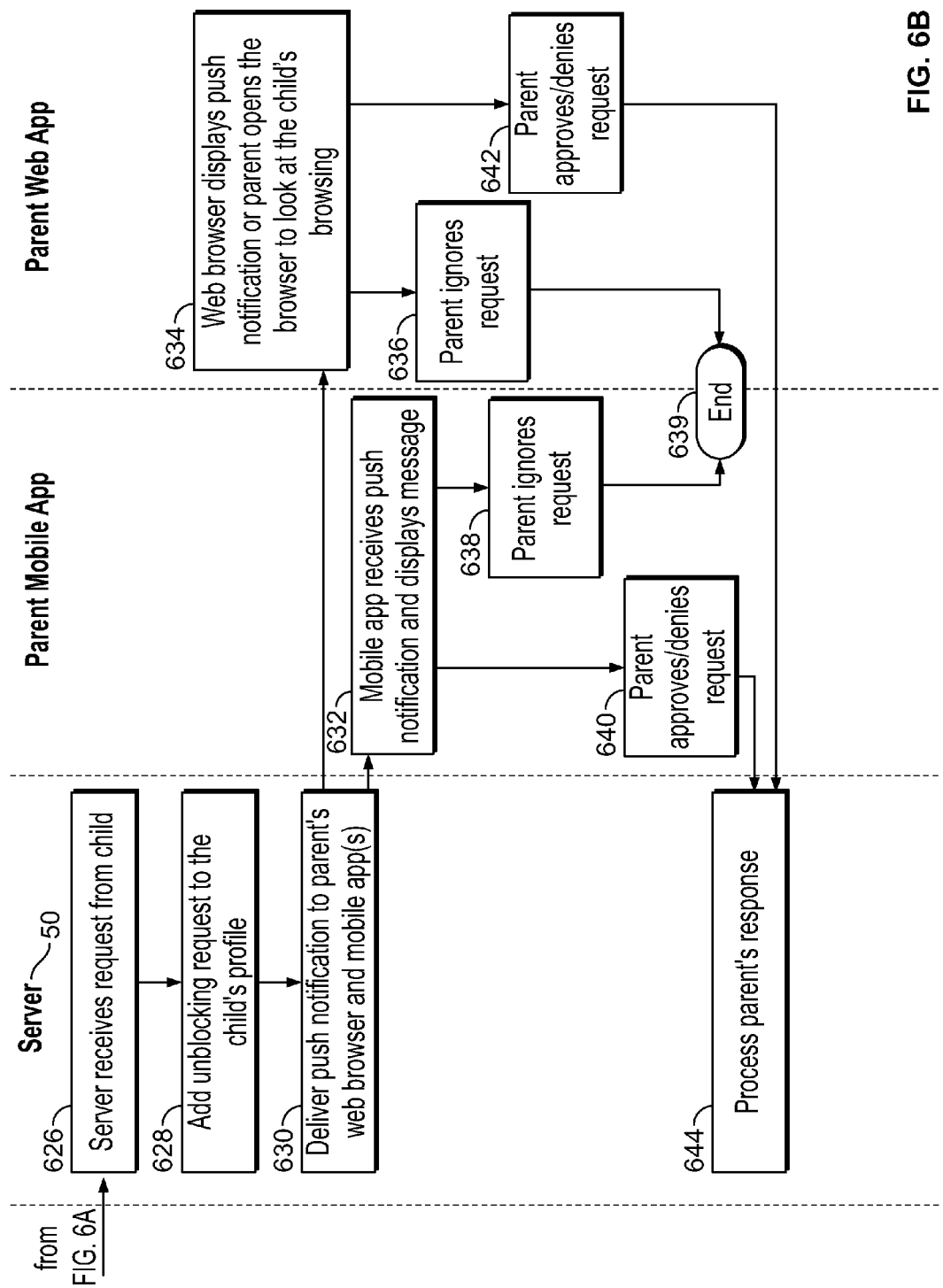
FIG. 6B is another portion of a flowchart showing an unblocking of the interactive system when the child is on a mobile device, as set forth in FIG. 6, according to an embodiment of the invention.

Referring to FIG. 6B, the parent's mobile and web apps are immediately notified of the request in operations 630-634. In operations 636-642, the parent may ignore the request or may approve or deny it. In FIG. 6C, the push notification is immediately sent to the child in operation 646 as before, and the app instantly notifies the child in operation 648 that the request has been approved or denied. In operation 649, the child responds to the push notification, triggering an update to be sent to the server in operation 653. In operation 650, the server sends a silent push notification to the background service to initiate an update. (A silent push is a notification that wakes up an application to do work in the background but does not alert the user, whereas a normal push notification typically tries to display a message, play a sound, or update a badge.) In operation 654, the server immediately sends the parent's response to the background service, browsing and blocked lists are instantly updated in the background service and the mobile app in operations 656-662, and the parent's response to the child's request is displayed in operation 664.

The biggest difference between the flowcharts in FIGS. 4 and 6 is that FIG. 4 illustrates operation with the web browser on a computer and FIG. 6 illustrates operation with the mobile app on a mobile device. In order to accommodate the "sandboxed" permissions model that currently exists on mobile operating systems, it is more difficult to operate a second process with a higher level or permission than the browser (background daemon). In addition, browsing extensions are not currently supported universally on mobile devices, and this leads to replacing a conventional web browser (e.g., Safari, Internet Explorer, Chrome, or Firefox) with a custom web browser and disabling the conventional browser. As mobile operating systems mature and catch up with desktop and laptop operating systems, there should be more parity between FIGS. 4 and 6.

Besides the operations shown in FIGS. 2A, 3, 4, and 6, other operations or series of operations may be used to provide interactive monitoring and approval. A parent may set up profiles for more than one child. More than one parent may be able to monitor each child. In some circumstances, more than one parent's approval may be required before a child may access a website. Moreover, the actual order of the operations in the flowcharts is not intended to be limiting, and the operations may be performed in any practical order. Also, some tasks that are described as being performed by the server, apps, and background daemon and service may be performed by the other components, and vice versa.

Real-Time, Immediate Activity Monitoring and Reporting

Another feature of the present invention is the ability to remotely monitor the child's Internet activity in real time. One way of doing this is by generating an immediate and real-time report showing the Internet activity of the child. This real-time activity report provides the parent up-to-the-minute information regarding what sites the child has visited, when the visits occurred, total time spent on the sites, total time spent on each device, and whether the visits occurred during times of unlimited browsing or during specific times of the day, such as late night, school time, homework time, etc. The report may be streamed to the parent upon request. The report may also gather activity from a past timeframe, e.g., past 8 hours, past 24 hours, past weekend, past week, etc., and may be converted into an Adobe Portable Document File (PDF) to be emailed to the parent so the parent can have a permanent activity record. The activity report may also include information regarding other apps the child is using or accessing while on the mobile device or computer.

Figure 7A:
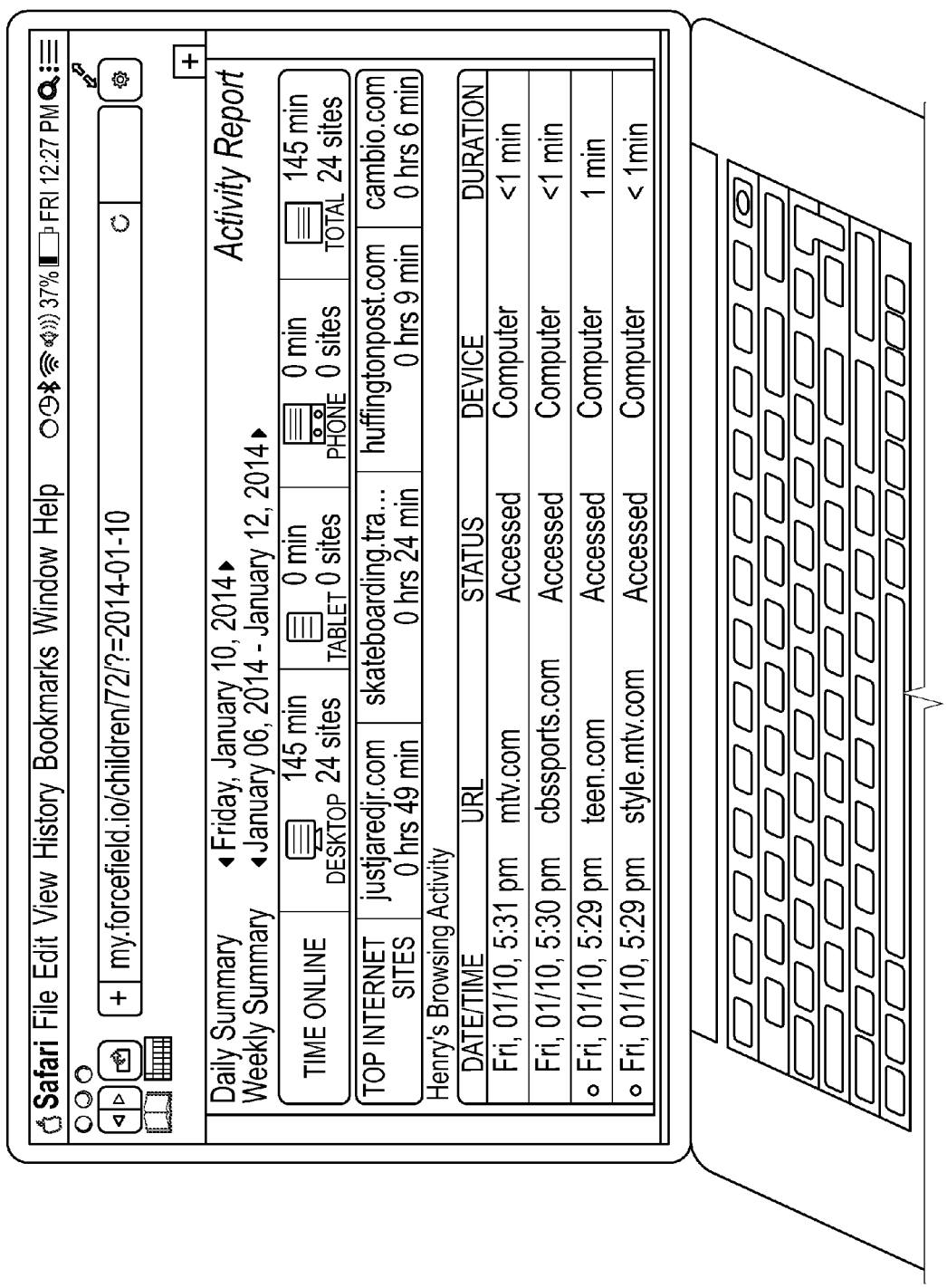
FIGS. 7A-7C are screen shots of activity reports, according to embodiments of the invention.
Figure 7B:
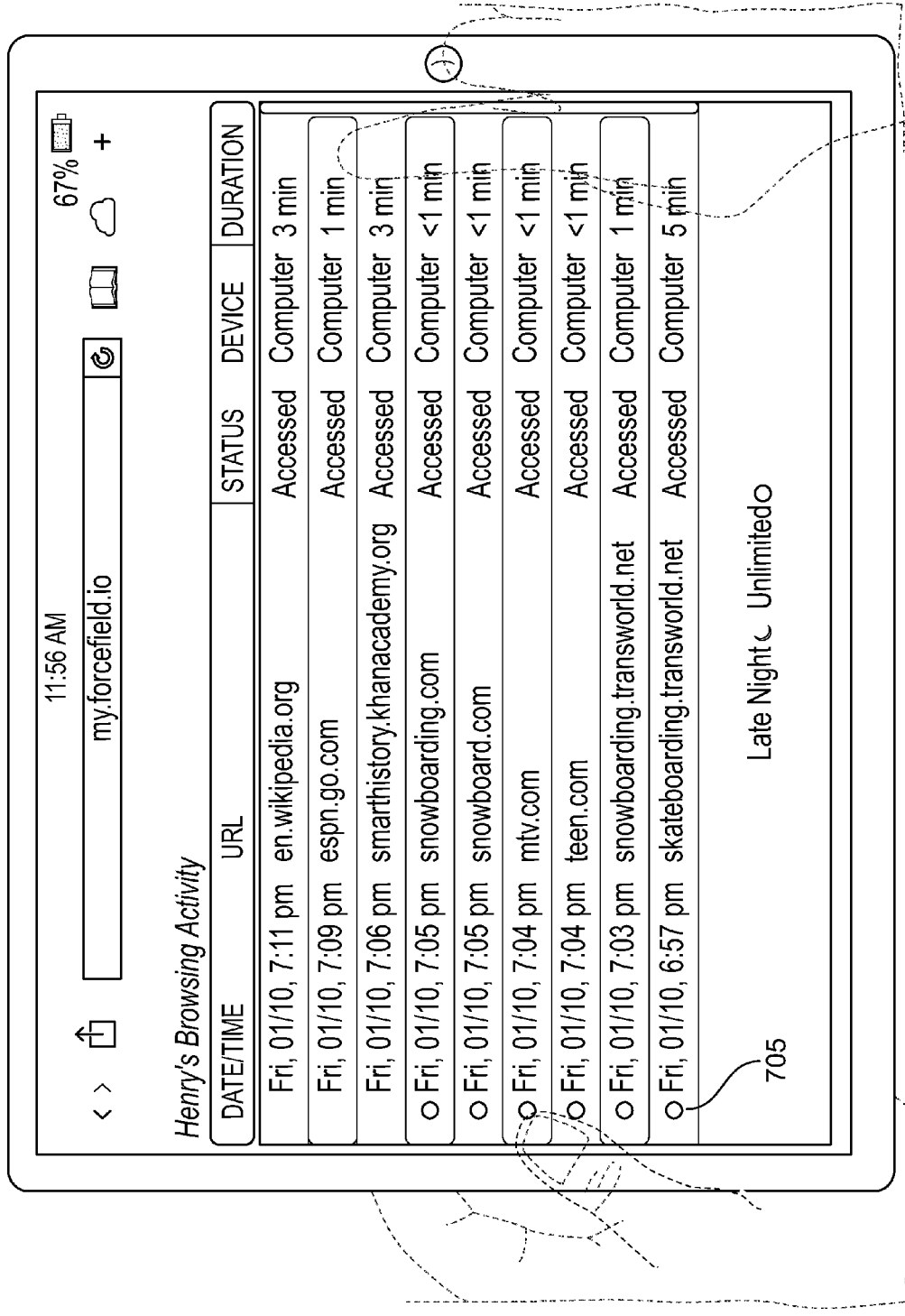
Figure 7C:
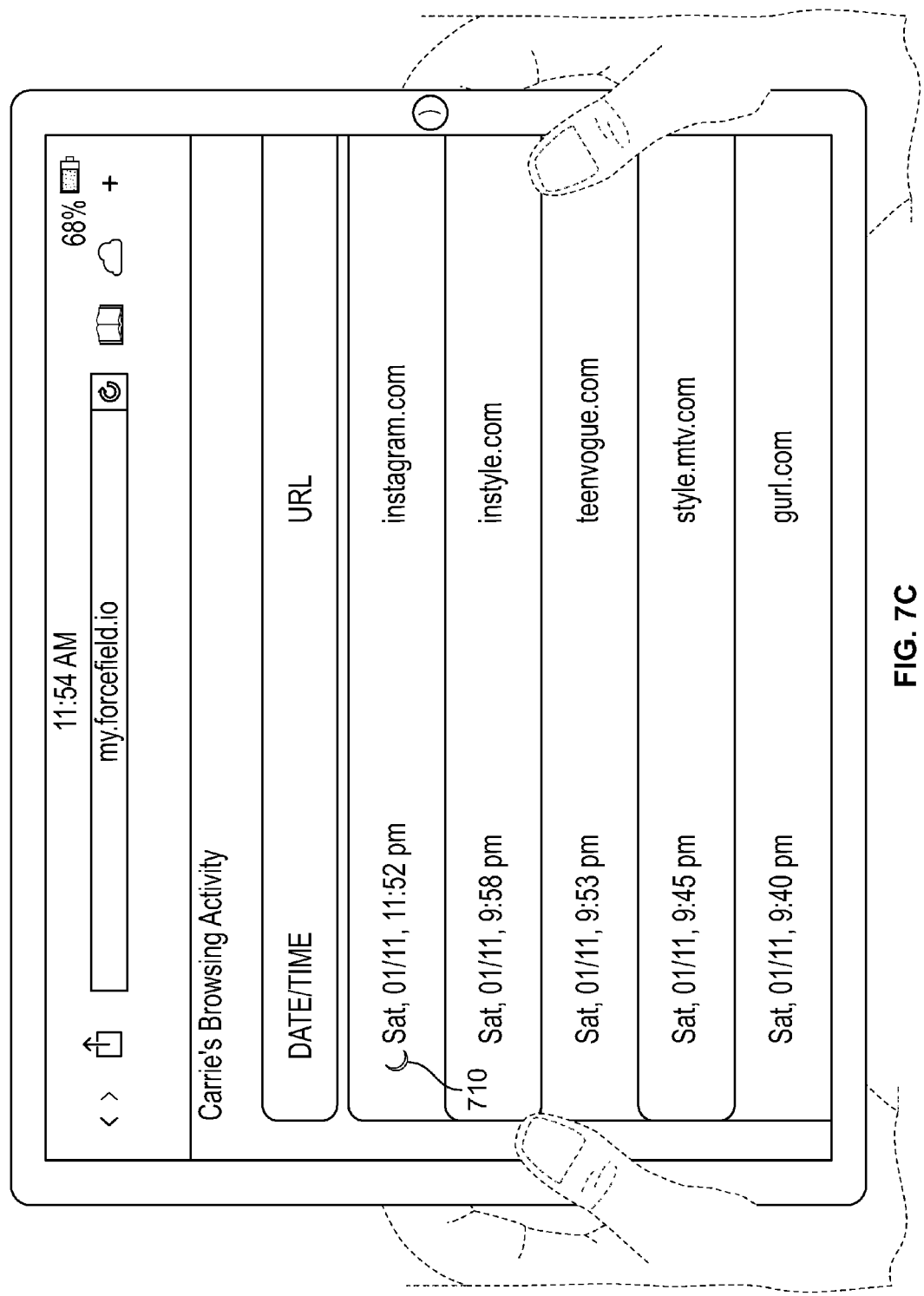

Examples of real-time activity reports are shown in FIGS. 7A-7C. The report in FIG. 7A shows total time online for a day or a week and how much time spent on each device—desktop computer, laptop computer, tablet, smartphone, etc. The report compiles information regarding the top visited sites based on time at each site. The report also includes each website visit, sortable by date and time, web address (URL), status (accessed or blocked), device (computer, tablet, smartphone, etc.), and duration of each visit. This report may be streamed to the parent's computer and/or mobile device for immediate and continuous viewing.

FIGS. 7B and 7C show other features of the activity report. In these figures, icons may be used to identify whether the visit was made during a period of unlimited browsing 705 and/or during a time of day 710. The reports in FIGS. 7B and 7C show an icon 710 that highlights late-night (e.g., between 11 PM and 7 AM) browsing, but there may also be icons for browsing during school time, homework time, etc. FIGS. 7B and 7C are shown on tablets, reflecting that activity reports can be displayed on mobile devices.

The activity report may also highlight the activity of a child's mobile device in certain circumstances, such as when the child is driving or operating a vehicle ("driving/operating mode") or attending school, work, a theater, or a house of worship ("attendance mode"), as described in a pending patent application assigned to the same assignee as this application—U.S. application Ser. No. 14/250,919, for "Apparatus and Method for Controlling Operation of a Device," the disclosure of which is hereby incorporated by reference. The app may recognize when the child's mobile device is in driving/operating and/or attendance mode and may immediately communicate that fact to the server to include on the activity report, for example by using a push notification. The activity report may also include which apps or websites the mobile device may be accessing or browsing during driving/operating or attendance mode, as well as communicate when the child's mobile device is no longer in driving/operating or attendance mode. The activity report may contain statistics or other real-time information regarding driving/operating mode, such as average driving speed and geo-spatial data describing where the child's mobile device is traveling or has traveled during driving/operating mode.

Figure 8:
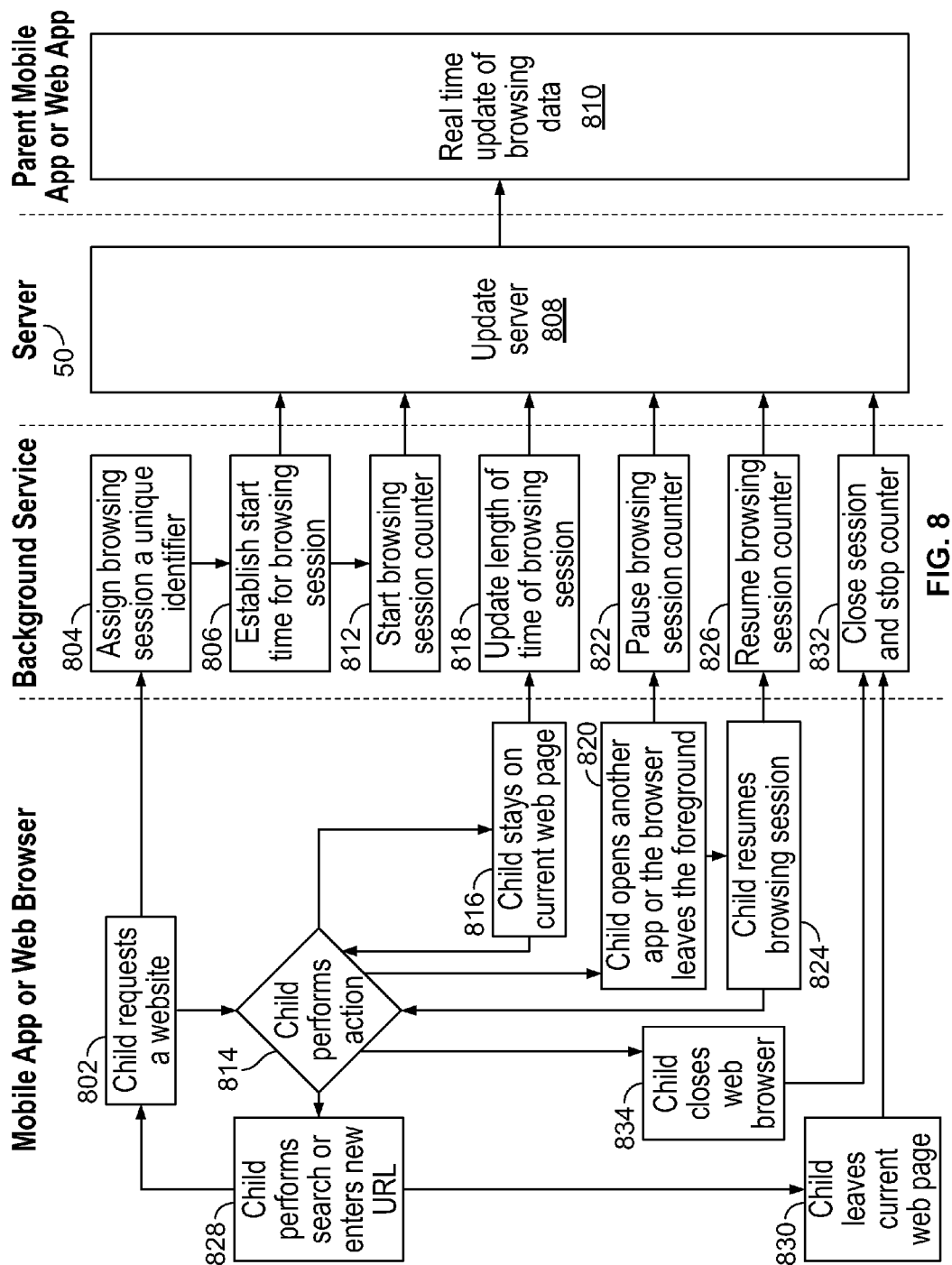
FIG. 8 is a flowchart showing activity tracking, according to an embodiment of the invention.

An example of how the activity tracking may be performed and the activity report immediately and continuously updated is shown in the flowchart in FIG. 8. In operation 802, when a child opens the web browser and enters an approved URL, the background service and monitoring system begins to track the browser usage and the websites that the child is visiting—even if the app is in unlimited browsing mode. This may be done in operation 804 by assigning a universally unique identifier (UUID) to the browsing session. This identifier allows the transmission of data to the server in real time, prevents time from being double counted, and allows the browsing time to be reported to the parent without waiting for a session to be completed.

Once the UUID is assigned, in operation 806 the start time for the browsing session in established. The server is immediately updated in operation 808, the server then updates the parent's mobile and web apps in real time in operation 810, and the browsing session counter is started in operation 812. At this point a parent who is looking at the app on a mobile device or on a computer will see the live, real-time data refresh and the new browsing session appear.

In operation 814, the child has several options after requesting a website. In operation 816, the child stays on the current web page. The background service and monitoring system detects this on a computer or mobile device that may have multiple windows by looking to see if the web browsing is in the foreground (the current window a child is using) and attempts to gauge if the window is covered by other content. This may be done in a variety of ways, for example by looking at the active applications and tracing the shapes of their windows or by looking at a copy of the content currently visible on the device. So long as the window is "active" (in the foreground or the foremost piece of content) the system tracks the amount of time by allowing a counter to increment. In operation 818, the browsing session length is then updated, the server is updated in operation 808, and the parent's mobile and web apps are also updated in operation 810. The flow returns to operation 814 (see arrow from 816 to 814) to determine the next child action. As the child stays on the web page (operation 816), the counter is incremented and regular updates are sent to the server, thus updating the real time data presented to the parent. Such updates may be made, for example, every 5, 10, 15, 30, 45, or 60 seconds (or more), depending on a setting that the parent may choose. Shorter intervals allow the parent to be updated more often, but may tend to reduce battery life. Longer intervals may save batter life, but the parent may miss being updated as frequently.

In operation 820, the child may open another app or for some other reason the browser leaves the foreground. In operation 822, the browsing session counter is paused, the server is updated in operation 808, and the parent's mobile and web apps are updated in operation 810, which shows that the browsing at that site stopped. In operation 824, the child may resume the browsing session by putting the browser window in the foreground. In operation 826, the browsing session counter resumes, and the server and the parent's mobile and web apps are accordingly immediately updated. The flow returns to operation 814 (see arrow from 824 to 814) to determine the next child action.

If the child performs a new search or enters a new URL in operation 828, the flow returns to operation 802 to start a new browsing session. In operation 830, the child is considered as leaving the current web page and thus the session is closed and the counter stopped in operation 832. In operation 834, the child may just close the browser which also closes the session and stops the counter. A final browsing session duration is then sent to the server and to the parent's mobile and web apps.

In another embodiment (not shown), if the child reopens the browser or navigates back to the website within five minutes (or some other suitably short amount of time) of closing the browser or leaving the webpage, the previous session may be reopened and time may continue to be added to the counter and the parent appropriately and immediately notified.

Besides the operations shown in FIG. 8, other operations or series of operations may be used to track activity. As mentioned above, a browsing session may be restarted if a website is reopened within a suitably short time. Moreover, the actual order of the operations in the flowcharts is not intended to be limiting, and the operations may be performed in any practical order. For example, operations 806-812 may occur nearly simultaneously. Also, some tasks that are described as being performed by the server, apps, and background service may be performed by the other components, and vice versa.

The activity report may also include another feature—"grabbing" photos that the child may post to a social networking site such as Facebook, Instagram, Snapchat, or Twitter. These photos may be posted immediately, allowing the parent to see what is being posted and giving the parent the opportunity to have the child remove the photo from the website if it is inappropriate. The activity report may show these photos as thumbnails that the parent can click on and either open the photos within the parent's app or be taken to the site to see the photos in their context.

Figure 9A:
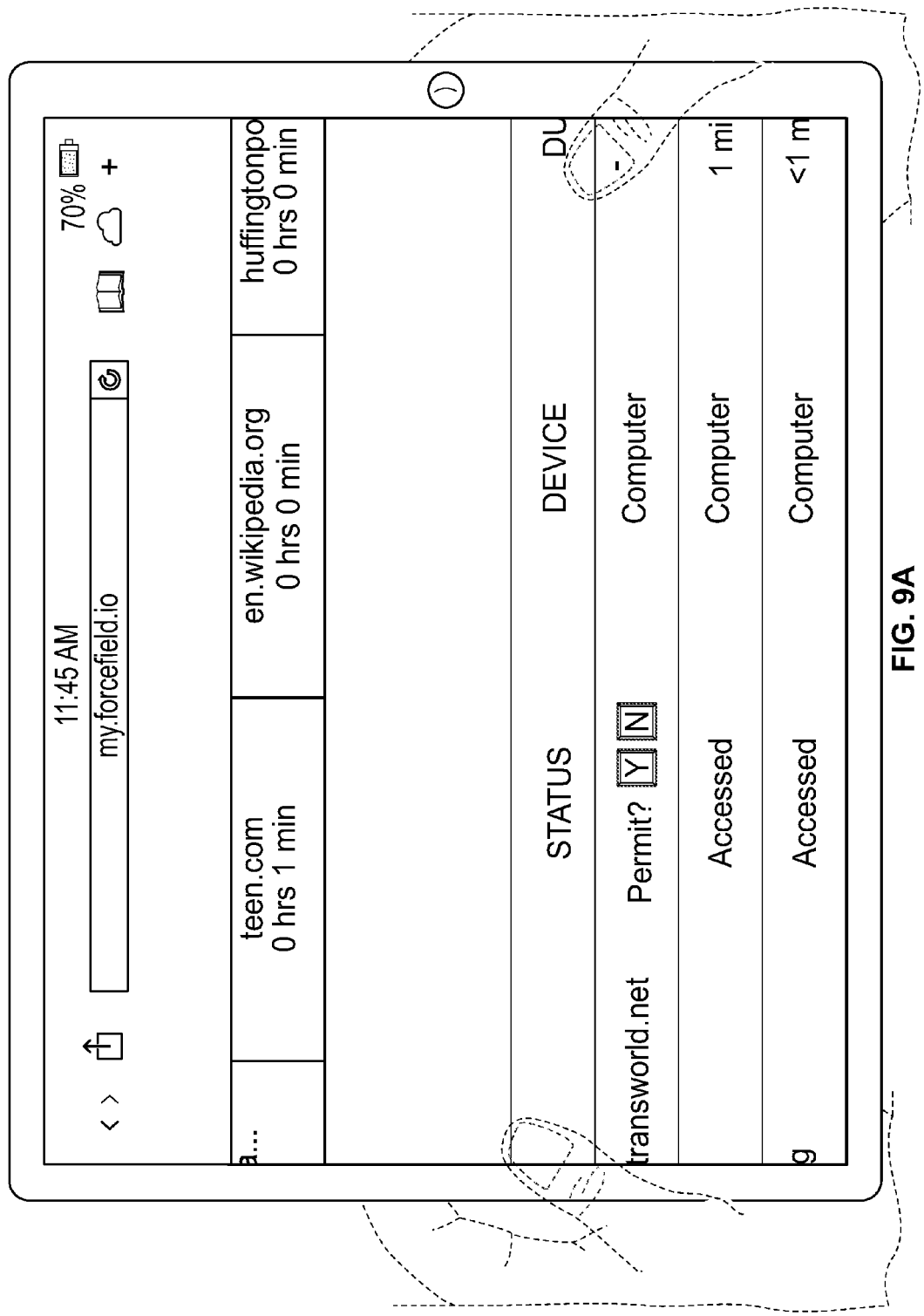

The activity report may also include approval functions, as shown in FIGS. 9A and 9B. In addition to the "status" of a website being accessed or blocked, websites that are pending approval could also be included, as shown in FIG. 9A. In this case, permission was requested by the child some time earlier, but the parent did not yet approve or deny the request. When viewing the activity report, the parent may be reminded that such requests are pending and given the option to remotely approve or deny the request from the activity report page on the parent's computer or mobile device. In another embodiment, shown in FIG. 9B, sites requested for approval from the community library may also be added to the parent's activity report for permission to access as well. FIGS. 9A and 9B are shown on tablets, reflecting that the approvals may be provided via an activity report displayed on a mobile device.

One objective of the present invention is to protect children from the hazards of a network such as the Internet. One benefit of the present invention is that it is flexible in providing real-time, remote, interactive monitoring and approval so that rigid pre-ordained monitoring rules may be modified if needed. The invention is flexible in the way that it treats children of different ages and who may have differing needs when it comes to Internet activity. The real-time interaction using mobile technology allows parents to monitor activity without physically having to be in the same room as the child. The real-time approval functions allow immediate communication between parents and children regarding specific websites or specific blocks of time to be used for unlimited browsing.

The distinction between mobile devices and computers may be significant in some embodiments of the invention if the primary target of the live updates of activity data and request notification are mobile devices that both the parent and a child may have. The application may provide real time updates to a computer web browser via a publish/subscribe messaging service (often called "pub/sub"), a web socket connection, or a browser push notification. On computers, this capability may end up being less than ideal because it is possible that for large periods of time, a parent will not be in front of his or her computer.

Another benefit of the invention is its ability to engage the parent and the child in real time. For example, if a child is doing homework and requires access to a website, the child may request access (either for website approval or for a period of unlimited browsing) and the parent is instantly notified of this request. When the parent acts on that request, the child is able to instantly continue with the homework by accessing the unblocked website after it is approved or during a just-approved period of unlimited browsing. Similarly, a parent may see live updates of the child's browsing activity, especially during times of unlimited browsing.

To facilitate this real time communication, a mobile device is generally preferred. Such a device will have a persistent connection to the Internet (or network) and the device can operate while it is put away or "wake up" to handle requests that are delivered from the server.

For some mobile devices, the application may use a background service with a socket or web socket connection, a pub/sub service, or push notifications to send event-driven data to the device in real time. Real time delivery may vary depending on the delivery mechanism. For example, the data would be delivered directly over a socket/websocket, but in the case of a push notification, the device is informed of the presence of new data and is then prompted to retrieve that data from the server.

Although this specification has used a parent-child relationship as an example, the invention may also be used at school or at work—anywhere a supervisory relationship may exist and one party may want to monitor and/or approve the network activity of another. At a school, a teacher or principal or administrator may want to monitor students' Internet activity, perhaps if they are doing a project using the Internet. At work, an employer may want to monitor employees' use of the Internet so as to discourage its use on company time and to encourage productivity.

The interactive monitoring and approval application may be used on various device platforms, such as iOS, Android, Windows, BlackBerry, Mac, and other platforms and operating systems that are currently used or may be used in the future to access the Internet or other network.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system for interactive network access approval, comprising:
a server configured to communicate with a web browsing application running on a first internet-accessible personal computing device for requesting access to a website on a network, and a monitoring application running on a second internet-accessible personal computing device for approving access to the website,
wherein the web browsing application includes (i) a browser extension configured to filter web browsing traffic, and a (ii) background daemon configured to monitor the browser extension, receive one or more requests to access a website from the browser extension, and communicate with the server;
wherein the server is configured to (i) receive one or more requests sent by the background daemon for access to the website before website content can be viewed through the web browsing application, (ii) determine whether access to the website may be granted based on a pre-existing list of permitted websites, and (iii) communicate to the background daemon a response to the request to access;
and if the website is not contained on the pre-existing list of permitted websites, the server is further configured to (iv) send a request to the monitoring application for the web browsing application to access the website; (v) receive from the monitoring application a permission or denial indication for the web browsing application to access the website; and (vi) immediately send the permission or denial indication to the background daemon;

and wherein the browser extension is configured to permit or deny access to the requested website based on the permission or denial indication as communicated to it through the background daemon.

2. The system of claim 1, wherein the server immediately transmits a notification of the approval to the web browsing application.

3. The system of claim 2, wherein the notification is a push notification.

4. The system of claim 1, wherein the web browsing application requests access to all websites on the network for a specific amount of time.

5. The system of claim 1, wherein the server generates an activity report comprising a real-time list of applications accessed by the web browsing application.

6. The system of claim 1, wherein the server generates an activity report comprising a real-time list of websites browsed by the web browsing application.

7. The system of claim 6, wherein the activity report is continuously updated and provided to the monitoring application.

8. The system of claim 1, wherein the server generates an activity report comprising a real-time list of photos uploaded by the web browsing application.

9. The system of claim 1, wherein the server generates an activity report comprising a real-time list of applications accessed by the web browsing application while the operation of the first device is being remotely controlled.

10. The system of claim 1, wherein the server generates an activity report comprising a real-time list of websites browsed by the web browsing application while the operation of the first device is being remotely controlled.

11. The system of claim 1, wherein access is granted for a specific amount of time.

12. The system of claim 1, wherein access to all websites is requested for a specific amount of time.

13. The system of claim 12, wherein access to all websites is immediately approved remotely.

14. The system of claim 1, wherein one or more requests and the permission or denial are transmitted using mobile devices.

15. The system of claim 1, wherein the website is part of a community library, and access to the website is immediately allowed for a predetermined amount of time.

16. The system of claim 1, wherein browsing on the website is monitored in real time by the monitoring application.

17. The system of claim 16, wherein the monitoring is performed remotely.

18. The system of claim 1, wherein the server preemptively allows access to websites included on a list of permitted websites without requiring requests to be sent to the monitoring application.

19. The system of claim 1, wherein the web browsing application further comprises a web browser controllable by the server.

20. The system of claim 1, wherein the web browsing application further comprises a web browsing environment controllable by the server.

21. The system of claim 1, wherein the web browsing application prevents the first internet-accessible personal computing device from accessing websites without utilizing the web browsing application.

22. A system for interactive network access approval, comprising:
a server configured to communicate with a first application running on a first internet-accessible personal computing device for requesting access to a website on a network, a second application running on a second internet-accessible personal computing device for approving access to the website, and a background service or extension configured to communicate with the server and the first application;
wherein the server is configured to (i) receive one or more requests sent by the background service or extension for access to a website not included in the first application's list of permitted websites, before website content can be viewed through the first application, (ii) determine whether access to the website may be granted based on a pre-existing list of permitted websites, and (iii) communicate to the background service or extension a response to the request to access;
and if the website is not contained on the pre-existing list of permitted websites, the server is configured to (iv) send a request to the second application for the first application to access the website; (v) receive from the second application a permission or denial indication for the first application to access the website site and (vi) immediately send the permission or denial indication to the background service or extension;
and wherein the first application is configured to permit or deny access to the requested website based on the permission or denial indication as communicated to it through the background service or extension.

23. A system for interactive network access approval, comprising:
a server configured to communicate with a web browsing application running on a first internet-accessible personal computing device for requesting access to a website on a network, and a monitoring application running on a second internet-accessible personal computing device for approving access to the website,
wherein the web browsing application includes (i) a browser extension configured to filter web browsing traffic and communicate with the server, and (ii) a background daemon configured to monitor the browser extension;
wherein the server is configured to (i) receive one or more requests sent by the browser extension for access to the website before website content can be viewed through the web browsing application, (ii) determine whether access to the website may be granted based on a pre-existing list of permitted websites, and (iii) communicate to the browser extension a response to the request to access;
and if the website is not contained on the pre-existing list of permitted websites, the server is further configured to (iv) send a request to the monitoring application for the web browsing application to access the website; (v) receive from the monitoring application a permission or denial indication for the web browsing application to access the website; and (vi) immediately send the permission or denial indication to the browser extension;
and wherein the browser extension is configured to permit or deny access to the requested website based on the permission or denial indication as communicated to it by the server.

24. A system for interactive network access approval, comprising:
a server configured to communicate with a first application running on a first internet-accessible personal computing device for requesting access to a website on a network, a second application running on a second internet-accessible personal computing device for approving access to the website, wherein the first application further contains a background service or extension configured to communicate with the server;

wherein the server is configured to (i) receive one or more requests sent by the background service or extension for access to a website not included in the first application's list of permitted websites, before website content can be viewed through the first application, (ii) determine whether access to the website may be granted based on a pre-existing list of permitted websites, and (iii) communicate to the background service or extension a response to the request to access;

and if the website is not contained on the pre-existing list of permitted websites, the server is configured to (iv) send a request to the second application for the first application to access the website; (v) receive from the second application a permission or denial indication for the first application to access the website site; and (vi) immediately send the permission or denial indication to the background service or extension;

and wherein the first application is configured to permit or deny access to the requested website based on the permission or denial indication as communicated to it through the background service or extension.

* * * * *